(12) United States Patent
Tomoe

(10) Patent No.: US 12,533,029 B2
(45) Date of Patent: Jan. 27, 2026

(54) OPTICAL COHERENCE TOMOGRAPHY IMAGE GENERATION DEVICE AND DENTAL CADCAM DEVICE

(71) Applicant: THE YOSHIDA DENTAL MFG. CO., LTD., Tokyo (JP)

(72) Inventor: Takeshi Tomoe, Tokyo (JP)

(73) Assignee: THE YOSHIDA DENTAL MFG. CO., LTD., Tokyo (JP)

( * ) Notice: Subject to any disclaimer, the term of this patent is extended or adjusted under 35 U.S.C. 154(b) by 371 days.

(21) Appl. No.: 18/550,376

(22) PCT Filed: Jun. 20, 2022

(86) PCT No.: PCT/JP2022/024601
§ 371 (c)(1),
(2) Date: Sep. 13, 2023

(87) PCT Pub. No.: WO2023/276766
PCT Pub. Date: Jan. 5, 2023

(65) Prior Publication Data
US 2024/0260833 A1    Aug. 8, 2024

(30) Foreign Application Priority Data
Jun. 28, 2021   (JP) .................... 2021-106966

(51) Int. Cl.
*A61B 5/00* (2006.01)
*A61C 3/02* (2006.01)
(Continued)

(52) U.S. Cl.
CPC .......... *A61B 5/0066* (2013.01); *A61B 5/0088* (2013.01); *A61C 3/02* (2013.01); *A61C 9/0073* (2013.01); *A61C 19/04* (2013.01)

(58) Field of Classification Search
CPC ..... A61B 1/24; A61B 5/0066; A61B 1/00194; A61B 5/0062; A61B 5/0088; A61C 19/04;
(Continued)

(56) References Cited

U.S. PATENT DOCUMENTS 10,517,482 B2 * 12/2019 Sato ................ A61C 7/002
11,633,268 B2 *  4/2023 Moalem ............ G06T 17/00
                                                433/203.1
(Continued)

FOREIGN PATENT DOCUMENTS

CN   109310476 B  *  3/2017  ............. A61B 34/10
JP      0329115 U      3/1991
(Continued)

OTHER PUBLICATIONS

Jamil Jivraj Penscriptive Depth-Controlled Robotic Laser Osteotomy BEng, Electrical Engineering, Ryerson University, 2010 MASc, Electrical & Computer Engineering, Ryerson University, 2013.*
(Continued)

*Primary Examiner* — Nicholas Augustine
(74) *Attorney, Agent, or Firm* — GRUMBLES LAW PLLC; Brittany Haanan

(57) ABSTRACT

An optical coherence tomography image generation device comprising: a tooth three-dimensional information measurer that irradiates a tooth with measuring laser light to measure tooth three-dimensional information, and visualizes the tooth three-dimensional information to display a tooth image on a display device; a laser cutter that irradiates the tooth with cutting laser light to cut the tooth; a two-dimensional scanning mechanism that scans laser light, which is either the measuring laser light and/or the cutting laser light, in two dimensions; a probe that includes the two-dimensional scanning mechanism, and outputs the laser light, which has (Continued)

passed through the two-dimensional scanning mechanism, from a tip thereof; and an optical path coaxializer that coaxializes an optical path of the measuring laser light entering the two-dimensional scanning mechanism with an optical path of the cutting laser light entering the two-dimensional scanning mechanism.

24 Claims, 23 Drawing Sheets

(51) Int. Cl.
    *A61C 9/00*                 (2006.01)
    *A61C 19/04*              (2006.01)

(58) Field of Classification Search
    CPC ......... A61C 5/77; A61C 1/0046; A61C 1/082; A61C 3/02; A61C 9/0046; A61C 9/0053; A61C 9/0073; A61C 13/0004; G01B 9/02031; G01B 9/02054; G01B 9/02091; G01B 11/00
    See application file for complete search history.

(56) References Cited

U.S. PATENT DOCUMENTS

| | | | |
|---|---|---|---|
| 11,918,824 B2* | 3/2024 | Kerbage | A61C 19/06 |
| 2003/0207235 A1* | 11/2003 | der Zel | B33Y 80/00 |
| | | | 433/223 |
| 2004/0106087 A1* | 6/2004 | Weigl | C04B 35/486 |
| | | | 264/16 |
| 2005/0177266 A1* | 8/2005 | Kopelman | A61C 13/0004 |
| | | | 700/117 |
| 2006/0090361 A1* | 5/2006 | Matsuda | A61C 13/0004 |
| | | | 33/514 |
| 2006/0093985 A1* | 5/2006 | Matsuda | A61C 5/77 |
| | | | 433/50 |
| 2007/0190493 A1* | 8/2007 | Yamamoto | A61C 13/0004 |
| | | | 433/221 |
| 2008/0177409 A1* | 7/2008 | Matsuda | G06T 19/00 |
| | | | 700/98 |
| 2010/0296098 A1 | 11/2010 | Bonnema et al. | |
| 2012/0092461 A1 | 4/2012 | Fisker et al. | |
| 2013/0110469 A1* | 5/2013 | Kopelman | A61B 5/0062 |
| | | | 703/1 |
| 2014/0272775 A1* | 9/2014 | Monty | A61C 9/006 |
| | | | 433/29 |
| 2014/0308623 A1* | 10/2014 | Chang | A61C 13/0004 |
| | | | 433/29 |
| 2015/0289954 A1* | 10/2015 | Chang | A61C 13/0004 |
| | | | 433/29 |
| 2017/0065370 A1* | 3/2017 | Nakai | A61B 5/0066 |
| 2018/0310825 A1 | 11/2018 | Kakuma | |
| 2018/0368694 A1* | 12/2018 | Abrams | A61C 9/006 |
| 2019/0298280 A1* | 10/2019 | Takada | A61B 6/52 |

FOREIGN PATENT DOCUMENTS

| | | | | |
|---|---|---|---|---|
| JP | 4845279 B2 * | 2/2001 | ......... | G03F 7/70058 |
| JP | 2007229310 A | 9/2007 | | |
| JP | 2012217753 A | 11/2012 | | |
| KR | 101542867 B1 | 8/2015 | | |

OTHER PUBLICATIONS

International Search Report and Written Opinion pertaining to corresponding International Application No. PCT/JP2022/024601, mailed Aug. 16, 2022.

* cited by examiner

OPTICAL COHERENCE TOMOGRAPHY IMAGE GENERATION DEVICE AND DENTAL CADCAM DEVICE

TECHNICAL FIELD

The present invention relates to an optical coherence tomography image generation device and a dental CAD/CAM device.

BACKGROUND ART

Recently in dentistry, a treatment method called minimal intervention, which minimizes the damage to tooth substance and pulp and only removes and repairs the actually deteriorated parts, has been widely adopted. For severe cases, there may be a need to perform treatments that include cutting the tooth from the side, so-called undercuts, for example. Early preventative treatments can realize minimal intervention before symptoms worsen.

A system has been conventionally known in which an oral cavity is captured with a three-dimensional scanner, digital impression data of the dental arch is created, and then restorations are produced with a dental CAD/CAM device. For instance, Patent Literature 1 discloses a three-dimensional scanner that the operator holds with a pistol-grip to capture the oral cavity. The conventional system integrates this three-dimensional scanner for capturing the oral cavity with a dental CAD/CAM device. In this conventional system, after the dentist removes the caries from the affected area and performs cuttings for filling with dental restorations (such as inlays or onlays), the three-dimensional scanner is used to obtain digital impression data corresponding to the surface of the dental arch in the oral cavity for CAD input.

Furthermore, a proposal has been made for an optical coherence tomography image generation device (OCT device) that measures the internal information of a tooth by irradiating the tooth with laser light via a probe held by the operator (see Patent Literature 2).

CITATION LIST

Patent Literature

Patent Literature 1: JP 5654583 B2
Patent Literature 2: JP 6712106 B2

SUMMARY OF INVENTION

Technical Problem

The measurement accuracy of the resolution of conventional three-dimensional scanners is low (about 50 μm), and it is necessary to spray powder or the like on the surface of the teeth to ensure accuracy, as diffuse reflections and transmissions occur on the tooth surface.

In addition, while the conventional optical coherence tomography image generation device can accurately measure the internal information of the teeth, there is room for improvement so it can be used for minimal intervention treatments.

The present invention has been made in view of the above circumstances, and aims to provide an optical coherence tomography image generation device and a dental CAD/CAM device that can be used for minimal intervention treatments.

Solution to Problem

An optical coherence tomography image generation device according to the present invention to achieve the above object includes: a tooth three-dimensional information measurer that irradiates a tooth with measuring laser light to measure a tooth surface shape and tooth interior as tooth three-dimensional information, and visualizes the tooth three-dimensional information to display a tooth image on a display device; a laser cutter that irradiates the tooth with cutting laser light to cut the tooth; a two-dimensional scanning mechanism that scans laser light, which is either the measuring laser light and/or the cutting laser light, in two dimensions; a probe that includes the two-dimensional scanning mechanism, and outputs the laser light, which has passed through the two-dimensional scanning mechanism, from a tip thereof; and an optical path coaxializer that coaxializes an optical path of the measuring laser light entering the two-dimensional scanning mechanism with an optical path of the cutting laser light entering the two-dimensional scanning mechanism.

A dental CAD/CAM device according to the present invention includes: a tooth three-dimensional information measurer that irradiates a tooth with measuring laser light to measure a tooth surface shape and tooth interior as tooth three-dimensional information, and visualizes the tooth three-dimensional information to display a tooth image on a display device; a laser cutter that irradiates the tooth with cutting laser light to cut the tooth; a two-dimensional scanning mechanism that scans laser light, which is either the measuring laser light and/or the cutting laser light, in two dimensions; a probe that includes the two-dimensional scanning mechanism, and outputs the laser light, which has passed through the two-dimensional scanning mechanism, from a tip thereof; an optical path coaxializer that coaxializes an optical path of the measuring laser light entering the two-dimensional scanning mechanism with an optical path of the cutting laser light entering the two-dimensional scanning mechanism; a tooth fixer that fixes the probe to the tooth; a restoration designer that designs dental restorations based on the tooth three-dimensional information measured by the tooth three-dimensional information measurer; and a restoration producer that produces dental restorations based on data obtained from the restoration designer.

Advantageous Effects of Invention

The present invention makes it possible to accurately control both the three-dimensional information acquisition position by the measuring laser light and the cutting position by the cutting laser light, and thus can be used for minimal intervention treatments.

BRIEF DESCRIPTION OF DRAWINGS

FIG. 3A shows a probe using a rotating optical path switcher, and FIG. 3B shows a probe using an optical path sharer.

FIG. 5A shows a mouthpiece-type orthodontic device, FIG. 5B shows a dental mouthpiece, and FIGS. 5C and 5D each show a tooth fixer using a sports mouthpiece.

FIG. 11A shows an example of a measurement target tooth, FIG. 11B shows a pre-cut tooth surface shape and a restoration-filled surface shape, and FIG. 11C shows a measurement region.

FIG. 13A shows a pre-cut screen display, and FIG. 13B shows a post-cut screen display.

FIG. 15A is a flowchart showing the processing flow of the optical coherence tomography image generation device, and FIG. 15B is a flowchart showing the flow of automatic cutting processing by the tooth cutting program created by the optical coherence tomography image generation device.

FIG. 16A shows a cutting region specified on the screen, and FIG. 16B shows a cutting range in the tomographic image and 3D image.

FIG. 18A shows an example of a histogram of brightness values in the cutting range, and FIG. 18B shows a flowchart of the flow of tissue identification process of the cutting range.

DESCRIPTION OF EMBODIMENTS

First Embodiment

Figure 1:
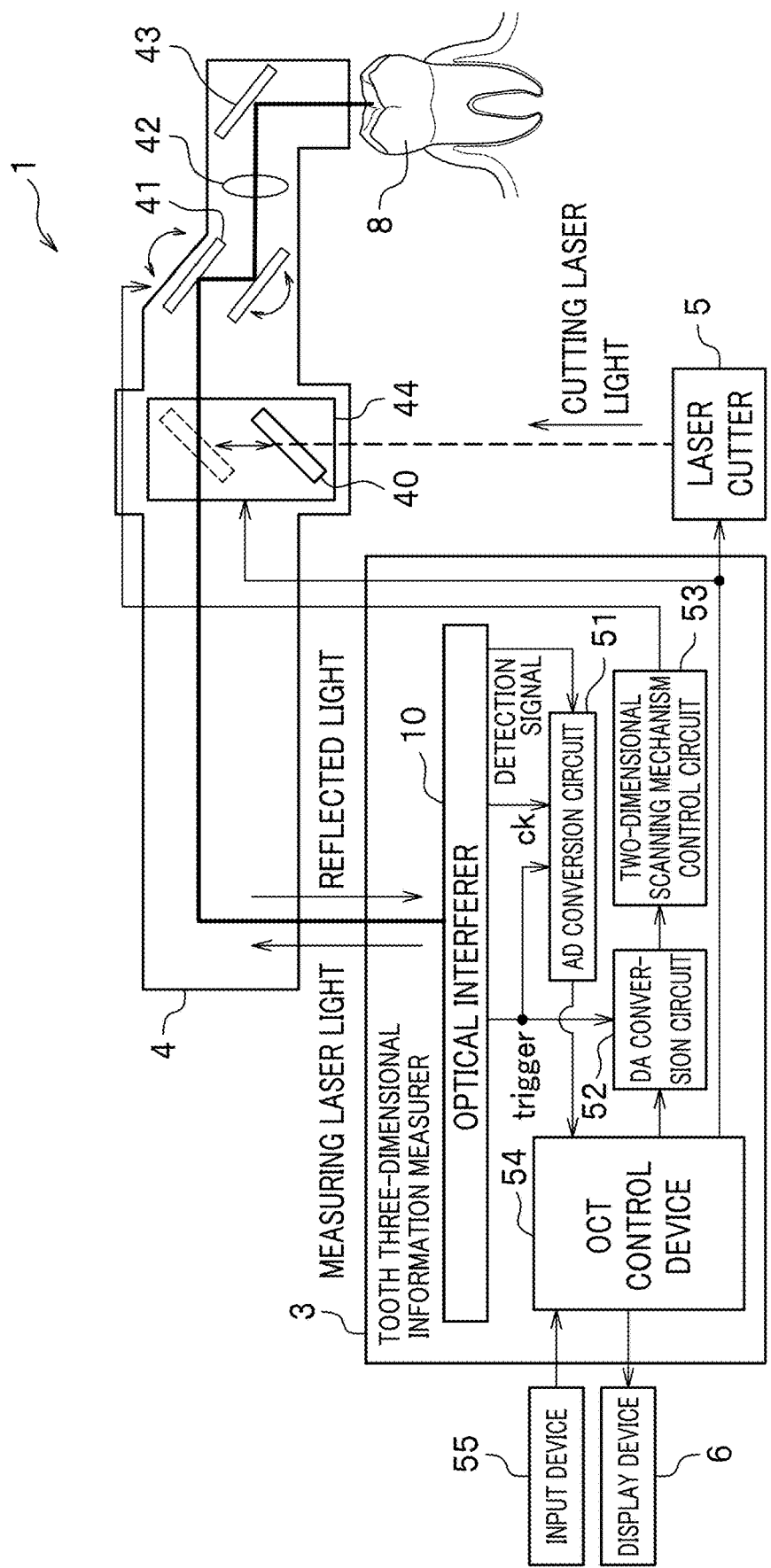
FIG. 1 is a schematic diagram showing the configuration of an optical coherence tomography image generation device according to the first embodiment of the present invention.

As shown in FIG. 1, the optical coherence tomography image generation device 1 includes a tooth three-dimensional information measurer 3, a probe 4, a laser cutter 5, a two-dimensional scanning mechanism 41, and an optical path coaxializer 40. The tooth three-dimensional information measurer 3 irradiates the tooth 8 with measuring laser light to measure the tooth surface shape and tooth interior as tooth three-dimensional information, and visualizes the tooth three-dimensional information to display a tooth image on the display device 6. The laser cutter 5 irradiates the tooth with cutting laser light to cut the tooth. The two-dimensional scanning mechanism 41 scans the laser light, which is either the measuring laser light and/or the cutting laser light, in two dimensions. The probe 4 includes the two-dimensional scanning mechanism 41, and outputs the laser light, which has passed through the two-dimensional scanning mechanism 41, from the tip thereof. The optical path coaxializer 40 coaxializes the optical path of the measuring laser light entering the two-dimensional scanning mechanism 41 with the optical path of the cutting laser light entering the two-dimensional scanning mechanism 41.

The cutting laser light that the laser cutter 5 irradiates the teeth with is, for example, an erbium-YAG laser (Er: YAG), an erbium-chromium-YSGG laser (Er, Cr, YSGG), or a carbon dioxide laser. The laser cutter 5 is controlled, for example, by a control signal from the OCT control device 54 of the tooth three-dimensional information measurer 3.

When the optical path coaxializer 40 makes the optical paths coaxial, it means that the optical path through which the measuring laser light passes and the optical path through which the cutting laser light passes are the same, and this includes both cases where the two light beams overlap and the same optical path is used to switch each light beam. The optical path coaxializer 40 is composed of an optical system such as a mirror. In the example shown in FIG. 1, the probe 4 has an optical path for the measuring laser light and an optical path for the cutting laser light, which is arranged orthogonally to the optical path for the measuring laser light. Moreover, inside the probe 4, there is a coaxial optical path section where the optical path for the measuring laser light entering the two-dimensional scanning mechanism 41 and the optical path for the cutting laser light entering the two-dimensional scanning mechanism 41 are set coaxially. The coaxial optical path section includes the optical path between the optical path coaxializer 40 and the two-dimensional scanning mechanism 41.

Here, the optical coherence tomography image generation device 1 includes an optical path switcher 44. The optical path switcher 44 switches optical paths so that one optical path of either the measuring laser light or the cutting laser light is blocked and the other optical path passes through the two-dimensional scanning mechanism 41. The optical path switcher 44 slides the optical path coaxializer 40 to block the optical path of either the measuring laser light or the cutting laser light. In FIG. 1, by sliding the mirror of the optical path coaxializer 40 upward, only the cutting laser light reflected by the optical path coaxializer 40 reaches the two-dimensional scanning mechanism 41, and the measuring laser light is blocked by the mirror of the optical path coaxializer 40. By sliding the mirror of the optical path coaxializer 40 downward, the cutting laser light is blocked by the optical path coaxializer 40, and only the measuring laser light reaches the two-dimensional scanning mechanism 41.

Figure 2:
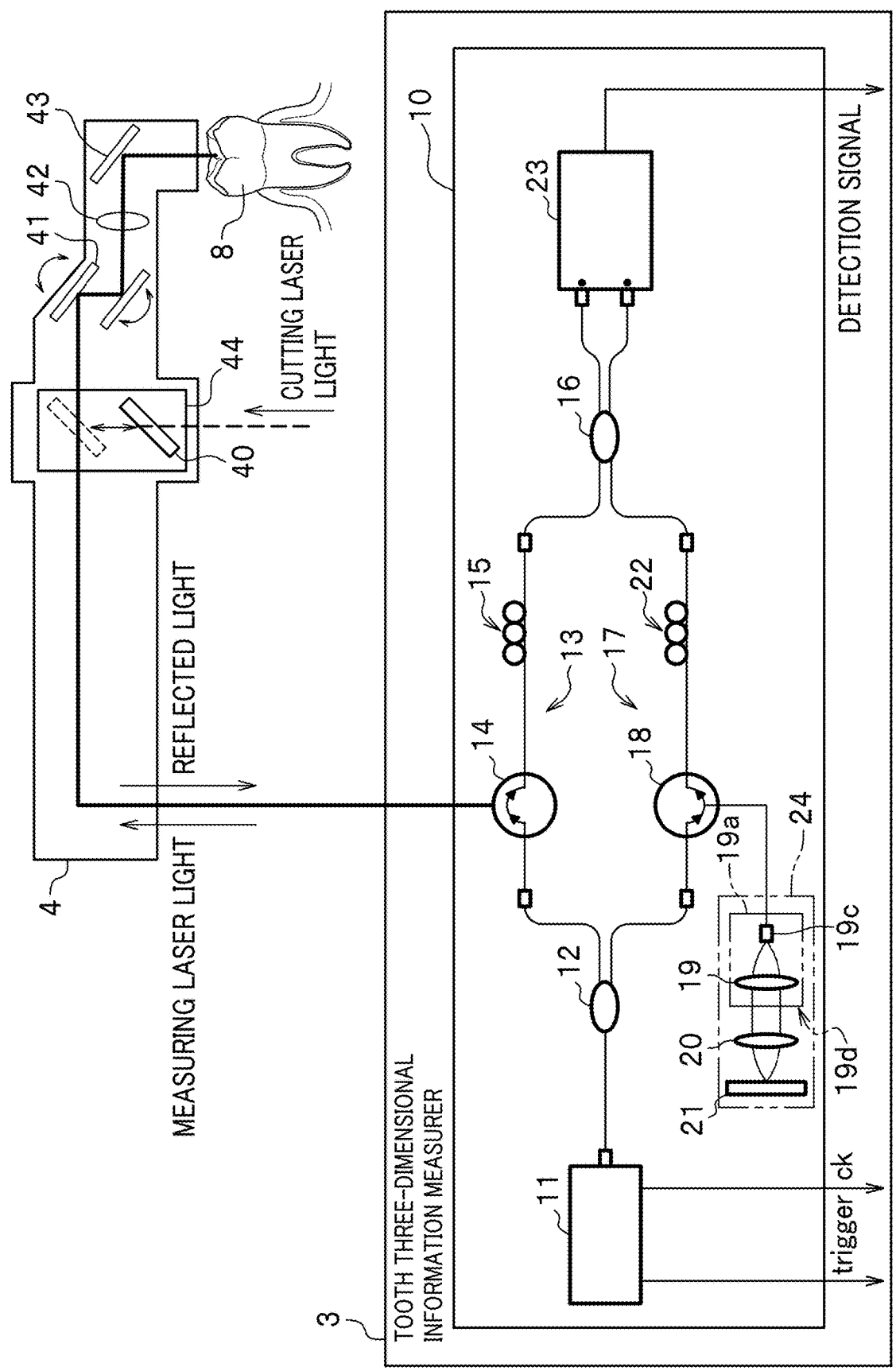
FIG. 2 is a schematic diagram showing an example of the configuration of the optical interferer of the optical coherence tomography image generation device in FIG. 1, with some parts omitted.

The tooth three-dimensional information measurer 3 includes an optical interferer 10. The optical interferer 10 can use the configuration of a conventional optical coherence tomography (OCT) device. A configuration example of the optical interferer 10 is shown in FIG. 2. The optical interferer 10 includes a light source, an optical system, and a detector, all of which are applicable to general OCT methods. The optical interferer 10 includes a light source 11 that periodically irradiates the tooth 8 with laser light, a detector 23 that detects internal information of the tooth 8, and optical fibers and various optical components provided in the optical path between the light source 11 and the detector 23. For example, as the light source 11, a laser light output device of the SS-OCT (Swept Source Optical Coherence Tomography) method can be used.

Here, the outline of the optical interferer 10 is described. Light emitted from the light source 11 is divided into measurement light and reference light by a coupler 12, which is an optical splitter. The measurement light enters the probe 4 from the circulator 14 of the sample arm 13. This measurement light is focused by the focusing lens 42 through the two-dimensional scanning mechanism 41 and the like, directed onto the tooth 8 via the mirror 43, and after scattering and reflecting there, it returns through the focusing lens 42, the two-dimensional scanning mechanism 41, and the like to the circulator 14 of the sample arm 13. The returned measurement light is inputted to the detector 23 via the coupler 16. Note that the focusing lens 42 used is a lens that transmits both wavelengths of the measuring laser light wavelength and the cutting laser light wavelength. Also, for the galvano mirror that constitutes the mirror 43 and the two-dimensional scanning mechanism 41, a mirror that reflects both wavelengths of the measuring laser light wavelength and the cutting laser light wavelength is used.

On the other hand, the reference light separated by the coupler 12 is passed from the circulator 18 of the reference arm 17 through the collimator lens 19 and focused by the focusing lens 20 on the reference mirror 21, and after reflecting there, it returns through the focusing lens 20 and the collimator lens 19 to the circulator 18. The returned reference light is inputted to the detector 23 via the coupler 16. In other words, since the coupler 16 combines the measurement light that scattered and reflected at the tooth 8 and returned, and the reference light that reflected at the reference mirror 21, the light (interference light) interfered by the combination can be detected as the internal information of the tooth 8 by the detector 23. Note that the polarization controller 15 of the sample arm 13 the polarization controller of the reference arm 17 are each installed to return the polarization that occurred inside the device to a state with less polarization.

The probe 4 includes a two-dimensional scanning mechanism 41 that performs a two-dimensional scan of laser light, and it guides the laser light from the optical interferer 10 to the tooth 8 and guides the light reflected at the tooth 8 to the optical interferer 10. In the present embodiment, the two-dimensional scanning mechanism 41 is composed of two galvano mirrors (X-direction galvano mirror and Y-direction galvano mirror) with rotation axes orthogonal to each other, and motors of each galvano mirror. Here, on the surface of the tooth 8 facing the tip of the probe 4, the X-direction corresponds to the horizontal direction (direction B: see FIG. 11C), and the Y-direction corresponds to the vertical direction (V-direction: see FIG. 11C). In the present embodiment, the cutting laser light is guided to the tooth 8 on the same optical path as the measuring laser light by the optical path switcher 44. The galvano mirror uses a mirror that can reflect the cutting laser light.

The tooth three-dimensional information measurer 3 includes an AD conversion circuit 51, a DA conversion circuit 52, a two-dimensional scanning mechanism control circuit 53, and an OCT control device 54. The AD conversion circuit 51 converts the analog output signal of the detector 23 into a digital signal. In the present embodiment, the AD conversion circuit 51 starts acquiring signals in synchronization with the trigger outputted from the laser output device, which is the light source 11, and acquires the analog output signal of the detector 23 in accordance with the timing of the clock signal ck also outputted from the laser output device, and converts it into a digital signal. This digital signal is inputted into the OCT control device 54.

The DA conversion circuit 52 converts the digital output signal from the OCT control device 54 into an analog signal. In the present embodiment, the DA conversion circuit 52 synchronizes with the trigger outputted from the light source 11 to convert the digital signal from the OCT control device 54 into an analog signal. This analog signal is inputted into the two-dimensional scanning mechanism control circuit 53.

The two-dimensional scanning mechanism control circuit 53 is a driver that controls the two-dimensional scanning mechanism 41 inside the probe 4. Based on the analog output signal from the OCT control device 54, the two-dimensional scanning mechanism control circuit 53 outputs a motor drive signal that drives or stops the motor of the galvano mirror (two-dimensional scanning mechanism), in synchronization with the output period of the laser light emitted from the light source 11. The two-dimensional scanning mechanism control circuit 53 performs the process of changing the angle of the mirror surface by rotating the rotation axis of one galvano mirror and the process of changing the angle of the mirror surface by rotating the rotation axis of the other galvano mirror at different timings. In addition, the two-dimensional scanning mechanism control circuit 53 outputs a motor drive signal that drives or stops the motor of the two-dimensional scanning mechanism 41 in synchronization with the cutting information (analog output signal) for operating the laser cutter 5, sent via the OCT control device 54 from the input device 55.

The OCT control device 54 performs imaging by controlling the two-dimensional scanning mechanism 41 in synchronization with the laser light emitted from the light source 11, and it also controls the generation of OCT images of the tooth 8 from the data converted from the detection signal of the detector 23. The OCT images and the like can be generated using known methods for generating optical coherence tomography images, etc. For example, at each measurement point during laser light irradiation, the OCT control device 54 performs frequency analysis (FFT processing) of the analog signal of the interference light resulting from the combined measurement light and reference light at the coupler 16, acquired by the detector 23, and acquires measured values (A-line data) in the depth direction (optical axis direction) progressing from the surface to the inside of the tooth 8. By scanning the measurement points in the horizontal direction (direction B: see FIG. 11C), the A-line data can be superimposed in direction B, and the cross-sectional image data of the tooth 8 (cross-sectional image A) can be acquired. Furthermore, by scanning the measurement points in the direction perpendicular to cross-section A (direction V: see FIG. 11C), this cross-sectional image A can be superimposed in direction V, forming a 3D image.

The OCT control device 54, for example, controls the optical path switcher 44 by commands from the input device 55 and inputs cutting information from the input device 55 to control the laser cutter 5. The input device 55 is a general device operated by the operator of the optical coherence tomography image generation device 1, and inputs various information, data, and commands to the OCT control device 54 so that the OCT control device 54 performs the above-mentioned processes, etc. The display device 6 is composed of, for example, a liquid crystal display (LCD) and the like, and displays the optical coherence tomography images and the like generated by the OCT control device 54.

According to the optical coherence tomography image generation device 1 with the above configuration, if the optical path through which the measuring laser light passes, and the optical path through which the cutting laser light passes, share the two-dimensional scanning mechanism 41, it is possible to control both three-dimensional information acquisition and laser cutting in two dimensions. Therefore, the optical coherence tomography image generation device 1 makes it possible to accurately control both the three-dimensional information acquisition position by the measuring laser light and the cutting position by the cutting laser light, and thus can be used for minimal intervention treatments. The optical coherence tomography image generation device 1 is suitable for early-stage treatment that does not include irradiation (undercutting) from the side of the tooth.

Modified Example

Figure 3A:
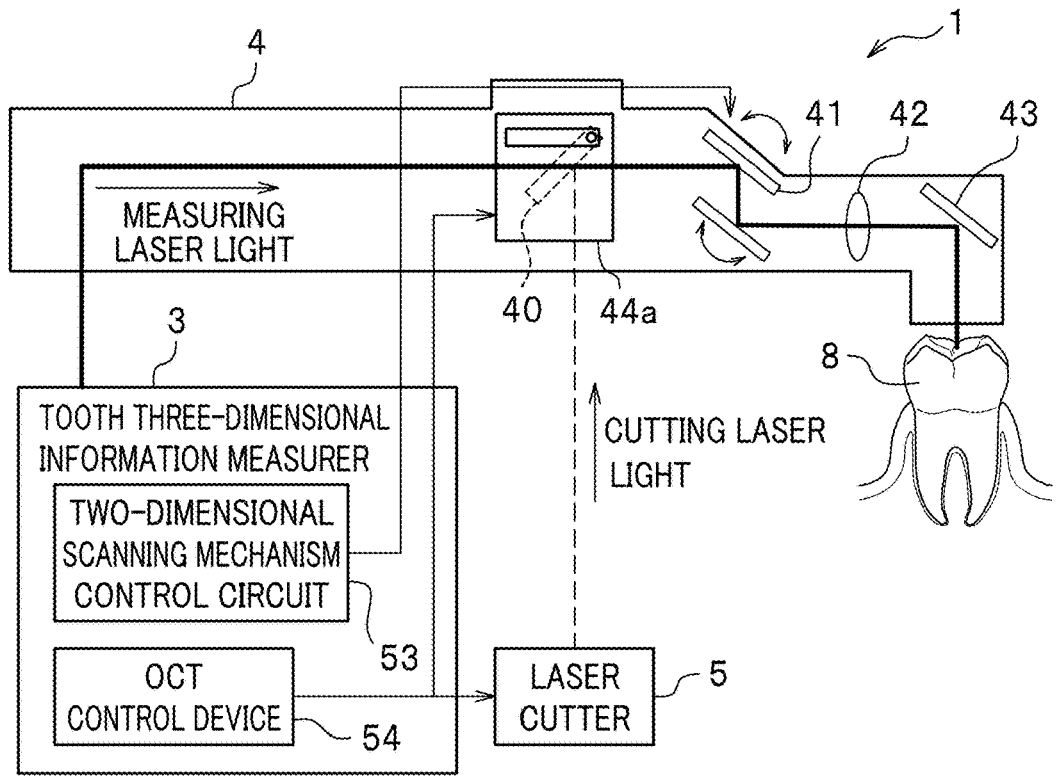
FIGS. 3A and 3B are each a schematic diagram showing a modified example of the probe of the optical coherence tomography image generation device in FIG. 1, with some parts omitted, where

A modified example of the first embodiment is described with reference to FIGS. 3A and 3B. The example shown in FIG. 3A depicts that the optical path switcher 44a of the probe 4 is different from the optical path switcher 44 of FIG. 1. The optical path switcher 44a rotates the optical path coaxializer 40 to block the optical path of either the measuring laser light or the cutting laser light. In FIG. 3A, by rotating the mirror of the optical path coaxializer 40 from a horizontal position to a predetermined angle, only the cutting laser light reflected by the optical path coaxializer 40 reaches the two-dimensional scanning mechanism 41, and the measuring laser light is blocked by the mirror of the optical path coaxializer 40. When the optical path switcher 44a rotates the mirror of the optical path coaxializer 40 to a horizontal position, the optical path from the cutting laser light to the two-dimensional scanning mechanism 41 is blocked, and only the measuring laser light reaches the two-dimensional scanning mechanism 41.

Figure 3B:
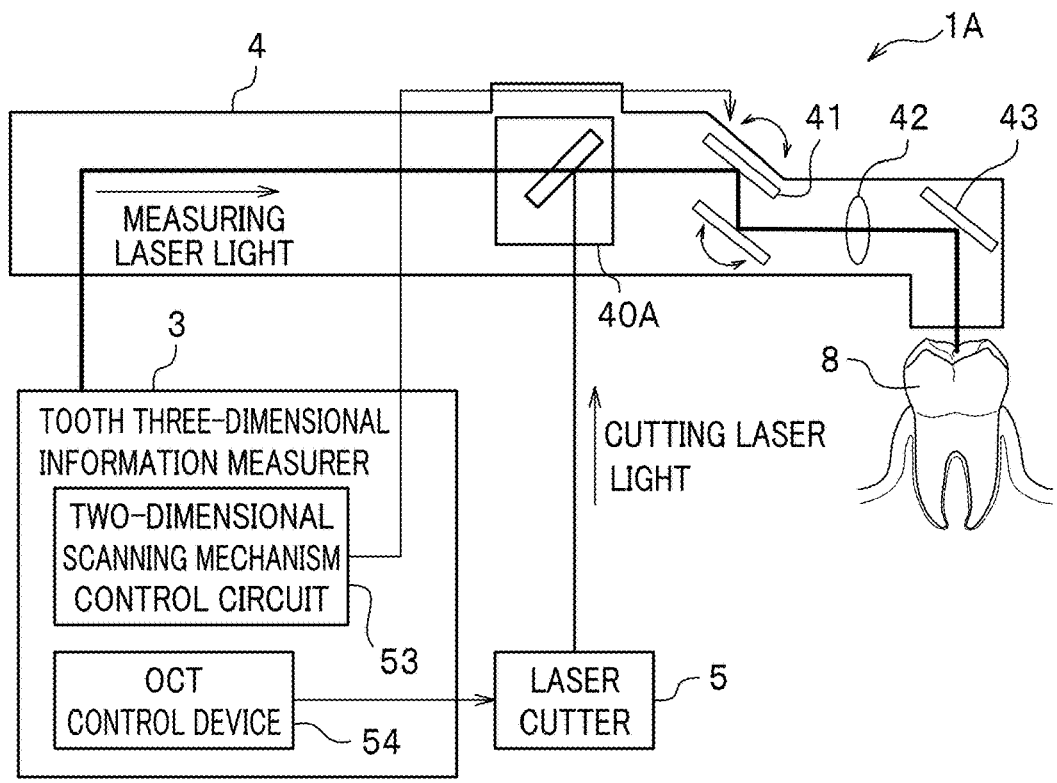

In the example shown in FIG. 3B, the probe 4 does not include an optical path switcher. The optical path coaxializer 40A of the probe 4 is an optical path sharer that shares the optical paths of the measuring laser light and the cutting laser light, which are incident from mutually perpendicular directions, and emits the measuring laser light and the cutting laser light to a two-dimensional scanning mechanism 41 via a coaxial optical path. The optical path coaxializer 40A is a beam splitter. The beam splitter reflects 50% of the input light and transmits 50% thereof. The beam splitter is determined by selecting a material, transmittance, and reflectance that match the wavelength and output of the cutting laser light. For example, fused quartz is used as the beam splitter material, and surface treatments such as chrome film or dielectric multilayer film coating are applied to the mirror surface.

The timing of allowing the measuring laser light and the cutting laser light to enter the optical path coaxializer 40A can be simultaneous, or they can alternately enter the optical path coaxializer 40A. For example, in the case where the measuring laser light and the cutting laser light are each continuously generated and are incident onto the optical path coaxializer 40A from mutually perpendicular directions at the same time, the measuring laser light and the cutting laser light can be simultaneously directed onto the tooth 8 from the tip of the probe 4, allowing for measurement and cutting to be performed simultaneously.

Additionally, in the case where the measuring laser light and the cutting laser light are each generated in a time division manner and are alternately incident onto the optical path coaxializer 40A from mutually perpendicular directions, the measuring laser light and the cutting laser light can be alternately directed onto the tooth 8 from the tip of the probe 4, allowing for measurement and cutting to be alternately performed.

Second Embodiment

Next, referring to FIGS. 4A to 4D (and FIG. 1 as needed), the optical coherence tomography image generation device 1 according to the second embodiment is described. Note that in FIGS. 4A to 4D, the area around the tip 45 of the probe 4 is shown as a critical part of the optical coherence tomography image generation device.

Figure 4A:
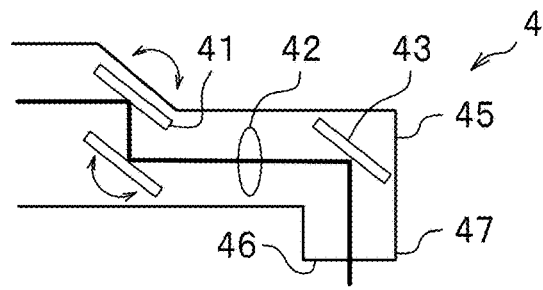
FIGS. 4A to 4D are each a schematic diagram showing the configuration of a probe of the optical coherence tomography image generation device according to the second embodiment of the present invention, with some parts omitted.
Figure 4B:
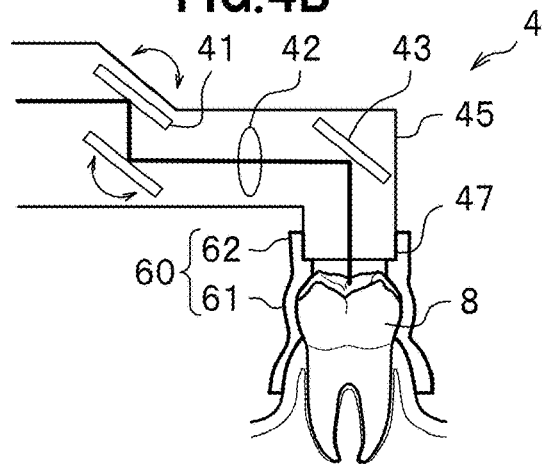

The optical coherence tomography image generation device 1, as shown in FIG. 4B, includes a tooth fixer 60. The tooth fixer 60 is used to fix the probe 4 to the tooth 8. The tooth three-dimensional information measurer 3 displays the image of the tooth fixed by the tooth fixer 60 on the display device 6, and the laser cutter 5 cuts the tooth fixed by the tooth fixer 60.

By fixing the probe 4 to the tooth 8 with the tooth fixer 60, the two-dimensional scanning mechanism 41 can plot both the measurement points by the measuring laser light and the irradiation points by the cutting laser light on the same coordinates. FIG. 4A shows the state where the tooth fixer 60 is removed from the probe 4. The tip 45 of the probe 4 includes a probe window frame 47 protruding downward, and the light emission port 46 is formed in the probe window frame 47.

As shown in FIG. 4B, the tooth fixer 60 includes a tooth fixation holder 61, and a probe holder 62. The tooth fixation holder 61 is capable of being attached and detached to the tooth and, when mounted on the tooth, it contacts and fixes to the tooth or periodontal tissues. The probe holder 62 specifies a single position for the probe when attaching to or detaching from the tip 45 of the probe 4. The probe holder 62 is opened on the side where the tooth is positioned when the tooth fixation holder 61 is fixed to the tooth.

In the example shown in FIG. 4B, the tooth fixation holder 61 is attached to the tooth, and the probe window frame 47, protruding downwards from the tip 45 of the probe 4, is inserted and fitted into the opening window of the probe holder 62. The probe holder 62 is preferably fixed to have positional reproducibility. When the probe 4 is removed, the tooth occlusal surface can be confirmed from the opening window, and the use of other cutting tools and treatment are possible. Once the tooth fixation holder 61 is fixed to the teeth or periodontal tissues, it should not be removed until both measurement and cutting are completed.

The optical coherence tomography image generation device 1, to prevent contamination of lenses or mirrors in the probe 4, preferably includes an air aspirator or an air blower within the tooth fixer 60. In the example shown in FIG. 4C, the optical coherence tomography image generation device 1 is provided with a hole in the tooth fixer 60 that allows for air flow. Additionally, the optical coherence tomography image generation device 1 includes an air aspiration device 64 that aspirates air through a hole in the tooth fixer 60 via a hose 641. In cases where it is possible to simultaneously perform measurement and cutting by having an optical path coaxializer 40A, as shown in FIG. 3B, there is a risk that the optical path of the measurement light may be blocked by the smoke generated during cutting. The air aspiration device 64, besides air, also functions as a smoke remover by aspirating smoke when smoke is generated by irradiation with the cutting laser light, thus eliminating the smoke. The smoke remover is preferably provided at the tip 45 of the probe 4. The hole that allows for air flow (smoke remover) may be provided in the probe 4 instead of the tooth fixer 60. The smoke remover may also be a means that removes smoke by blowing smoke.

Figure 4C:
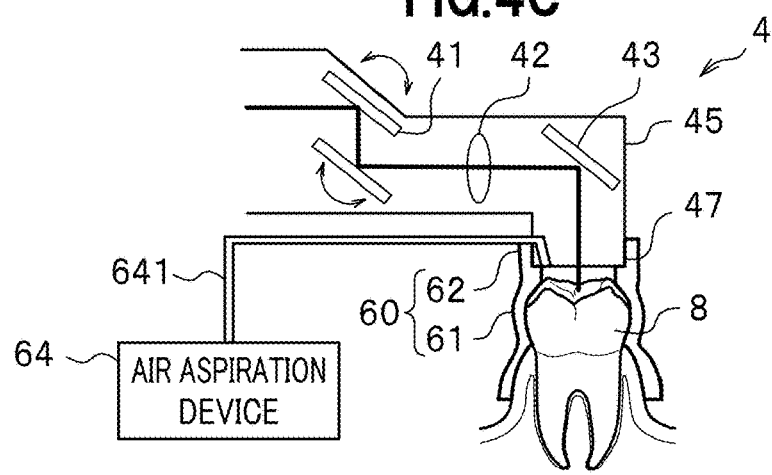
Figure 4D:
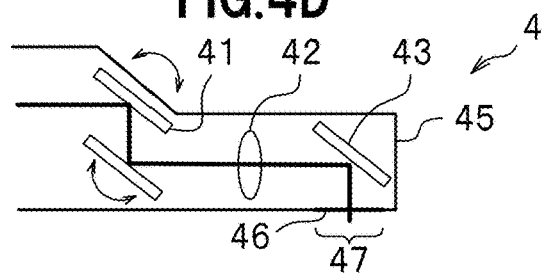

In FIGS. 4A to 4C, the probe 4 is assumed to have a probe attachment-detachment direction in the up and down (vertical) direction and is equipped with a probe window frame 47 protruding downwards, but in the case where the probe attachment-detachment direction is horizontal (sideways), as shown in the example in FIG. 4D, the probe window frame 47 may not need to protrude downward.

Hereinafter, variations of the tooth fixer 60 are described with reference to the drawings.

Figure 5A:
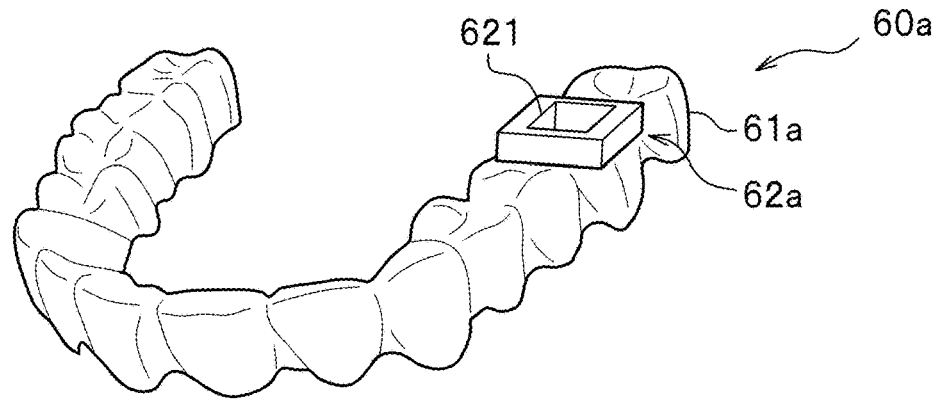
FIGS. 5A to 5D are each a schematic diagram showing a configuration example of a tooth fixer used in the optical coherence tomography image generation device of FIGS. 4A to 4D, where

The shape of the tooth fixation holder 61 may be a mouthpiece shape. The tooth fixer 60a shown in FIG. 5A includes a tooth fixation holder 61a and a probe holder 62a. The tooth fixation holder 61a uses a mouthpiece for orthodontic purposes generally referred to as an aligner or Invisalign (registered trademark). With this type of transparent mouthpiece, the operator can visually confirm the teeth from the outside. The probe holder 62a has an opening window 621 provided therein. The opening window 621 is designed to insert the probe window frame 47 at the tip of the probe 4.

Figure 5B:
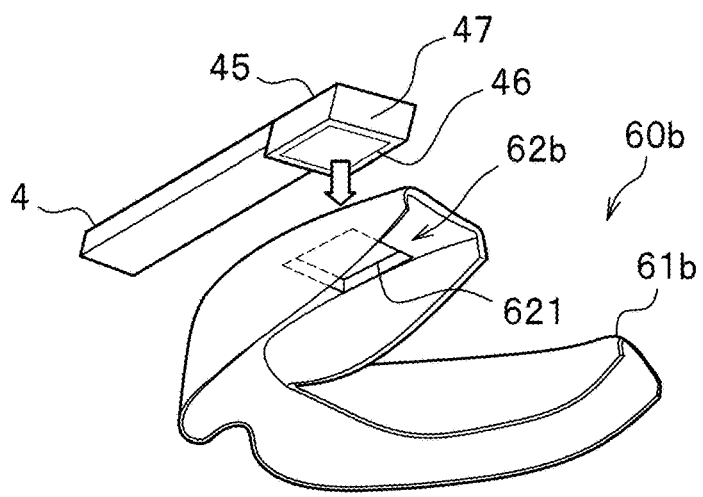
Figure 5C:
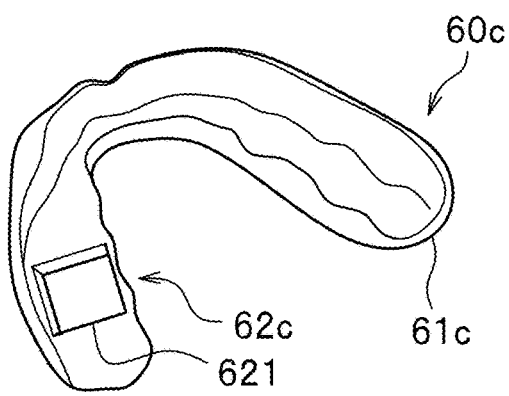
Figure 5D:
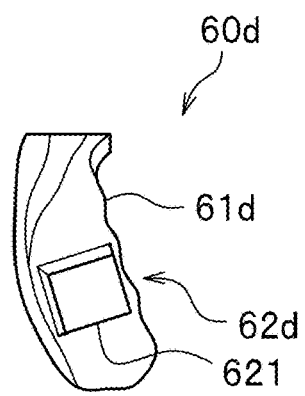

FIG. 5B shows the tooth fixer 60b viewed from below. The tooth fixer 60b includes a tooth fixation holder 61b and a probe holder 62b. The tooth fixation holder 61b uses a processed resin dental mouthpiece. The probe holder 62b has an opening window 621 provided therein. The left side of FIG. 5C shows the tooth fixer 60c viewed from below. The tooth fixer 60c includes a tooth fixation holder 61c and a probe holder 62c. The tooth fixation holder 61c uses a processed silicone rubber sports mouthpiece. The probe holder 62c has an opening window 621 provided therein.

The mouthpiece does not have to cover all the teeth and could be partial, as shown on the right of FIG. 5C, with the tooth fixer 60d covering around three teeth, for example. The tooth fixer 60d includes a tooth fixation holder 61d and a probe holder 62d. The tooth fixation holder 61d uses a portion of a sports mouthpiece. The probe holder 62d has an opening window 621 provided therein. The mouthpiece used in the tooth fixation holder 61 can be made using impression materials such as agar or alginate, or fabricated from mold making using an electronic impression with a 3D scanner.

Figure 6A:
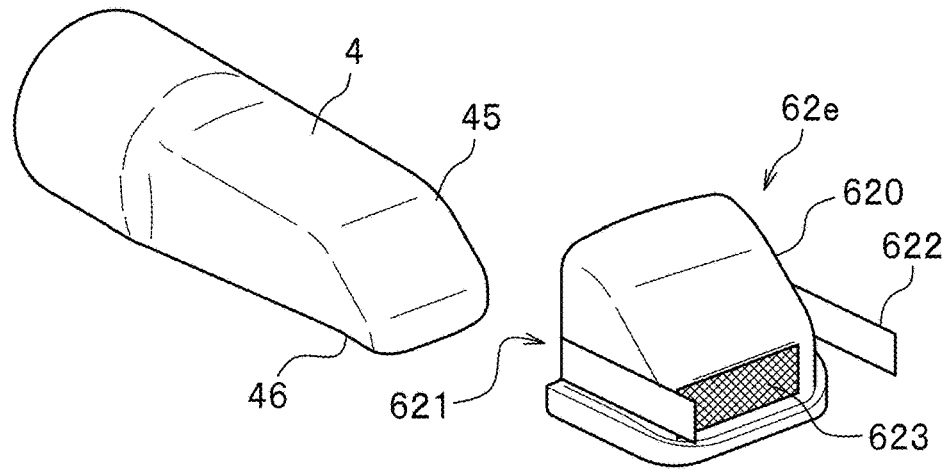
FIGS. 6A to 6C are each a schematic diagram showing a configuration example of a tooth fixer used in the optical coherence tomography image generation device of FIGS. 4A to 4D, showing the first configuration example of a tooth fixer using a rubber dam clamp.
Figure 6B:
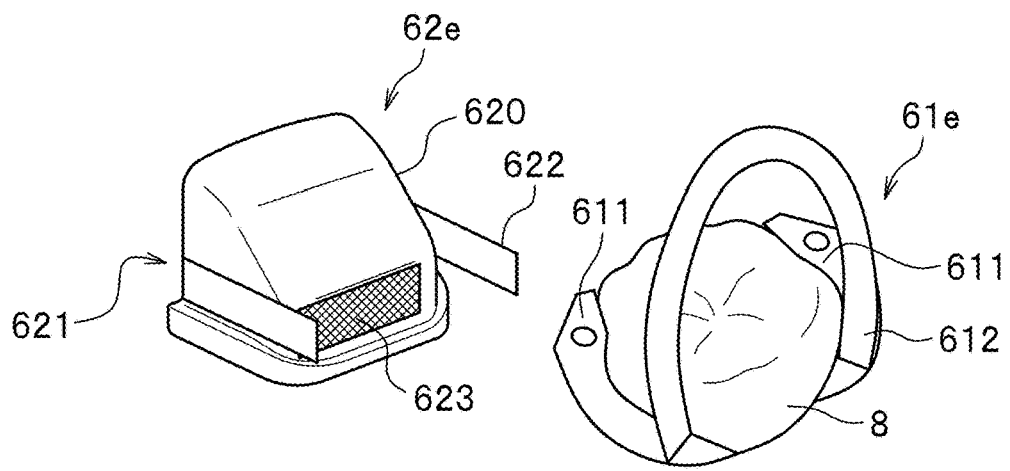
Figure 6C:
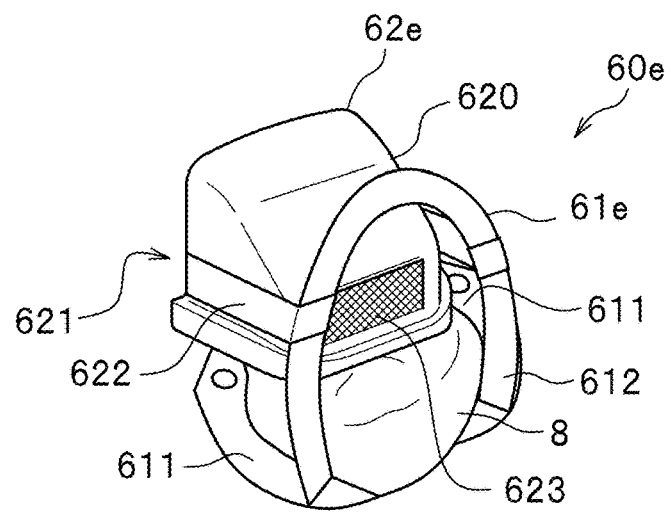

The tooth fixation holder 61 can use a fixation tool having a clamp, such as a commercially available rubber dam clamp. The tooth fixer 60e, shown in disassembled form in FIGS. 6A to 6C, includes a tooth fixation holder 61e, which is a fixation tool, and a probe holder 62e. FIG. 6A shows the probe holder 62e. FIG. 6B shows the tooth fixation holder 61e, which fixes the tooth 8. FIG. 6C shows the state where the probe holder 62e is connected and fixed to the tooth fixation holder 61e.

The tooth fixation holder 61e includes a pair of clamps 611 that clamp both side surfaces of the tooth 8, which is the measurement target, and is configured to freely open, close, and clamp the pair of clamps 611 by the elastic force of an elastic body. The tooth fixation holder 61e is where the pair of clamps 611 are connected by a connector 612. Note that when attaching and detaching the pair of clamps 611 to and from the tooth, they open and close by inserting into a pair of holes provided in the clamps 611, using a specialized clamp forceps, which are well-known and omitted from illustration, similarly to when using a commercially available rubber dam clamp.

The probe holder 62e includes a detacher main body 620, an opening window 621, a guide plate 622, and a magnet plate 623. The opening window 621 is provided on the backside of the detacher main body 620, and the detacher main body 620 has a space where the tip 45 of the probe 4 is inserted deep into the opening window 621. The guide plate 622 is formed on both sides of the detacher main body 620, and connects while holding the connector 612 of the tooth fixation holder 61e from the outside. The magnet plate 623 is formed on the front side of the detacher main body 620, and is used to connect and fix the probe holder 62e and the tooth fixation holder 61e.

Figure 7A:
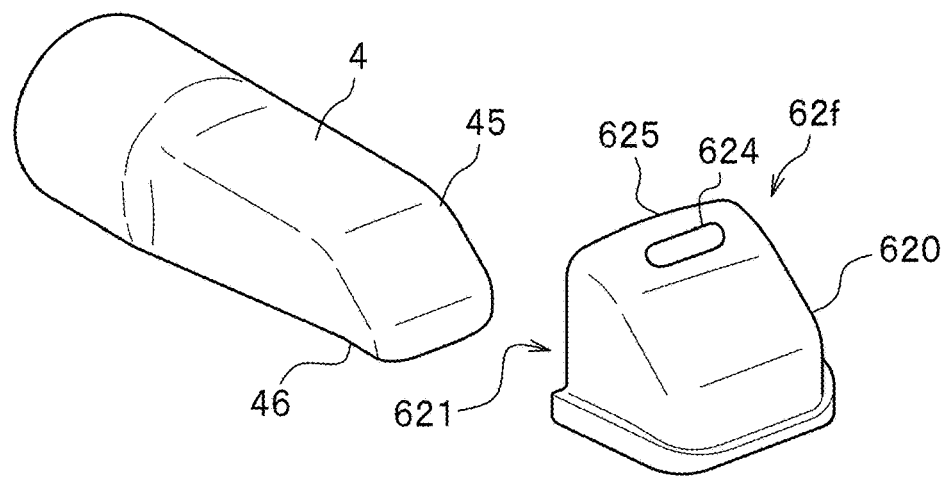
FIGS. 7A to 7C are each a schematic diagram showing a configuration example of a tooth fixer used in the optical coherence tomography image generation device of FIGS. 4A to 4D, showing the second configuration example of a tooth fixer using a rubber dam clamp.
Figure 7B:
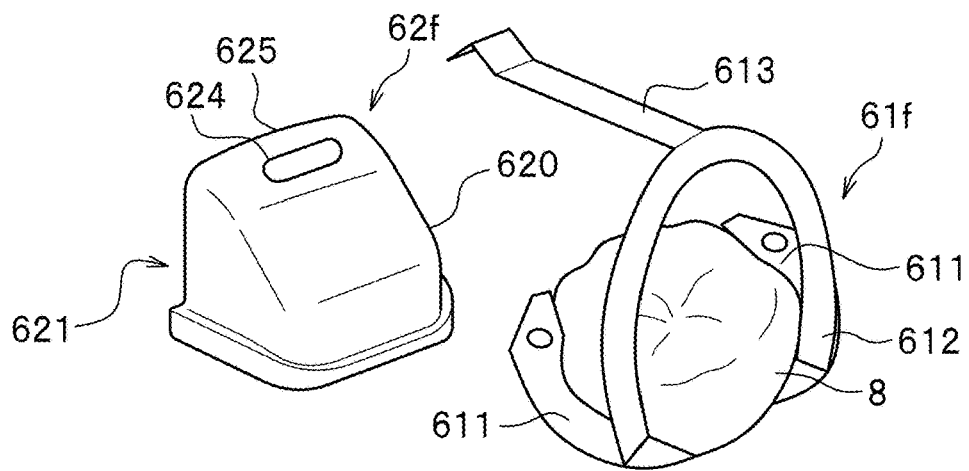
Figure 7C:
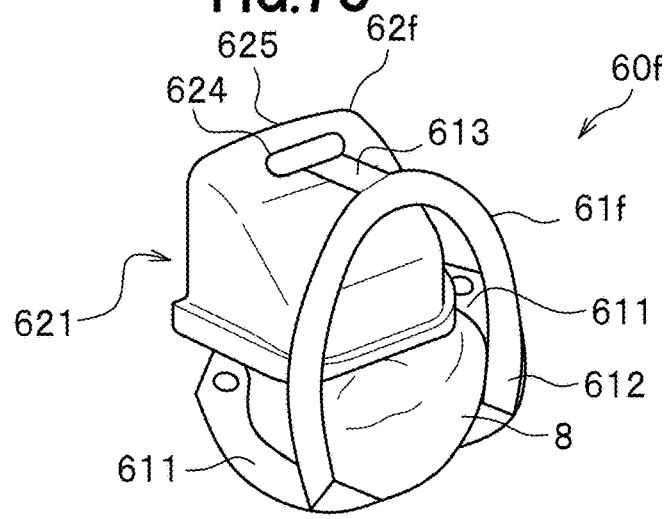

The tooth fixer 60f, shown in disassembled form in FIGS. 7A to 7C, includes a tooth fixation holder 61f, which is a fixation tool, and a probe holder 62f. FIG. 7A shows the probe holder 62f. FIG. 7B shows the tooth fixation holder 61f, which fixes the tooth 8. FIG. 7C shows the state where the probe holder 62f is connected and fixed to the tooth fixation holder 61f.

The tooth fixation holder 61f has a pair of clamps 611 that clamp both side surfaces of the tooth 8, which is the measurement target, and is configured to freely open, close, and clamp the pair of clamps 611 by the elastic force of an elastic body. The tooth fixation holder 61f is where the pair of clamps 611 are connected by a connector 612, and further includes a lock pin 613 on the connector 612.

The probe holder 62f includes a detacher main body 620, an opening window 621, an opening 624, and an engagement part 625. The opening 624 is provided in the upper part of the detacher main body 620. The engagement part 625 is a recess formed in the back side of the upper part of the opening 624 in the detacher main body 620, which can hook the lock pin 613 inserted into the opening 624. By pressing down the engaged lock pin 613 at a point close to the connector 612, it is possible to release the engagement of the lock pin 613.

Figure 8A:
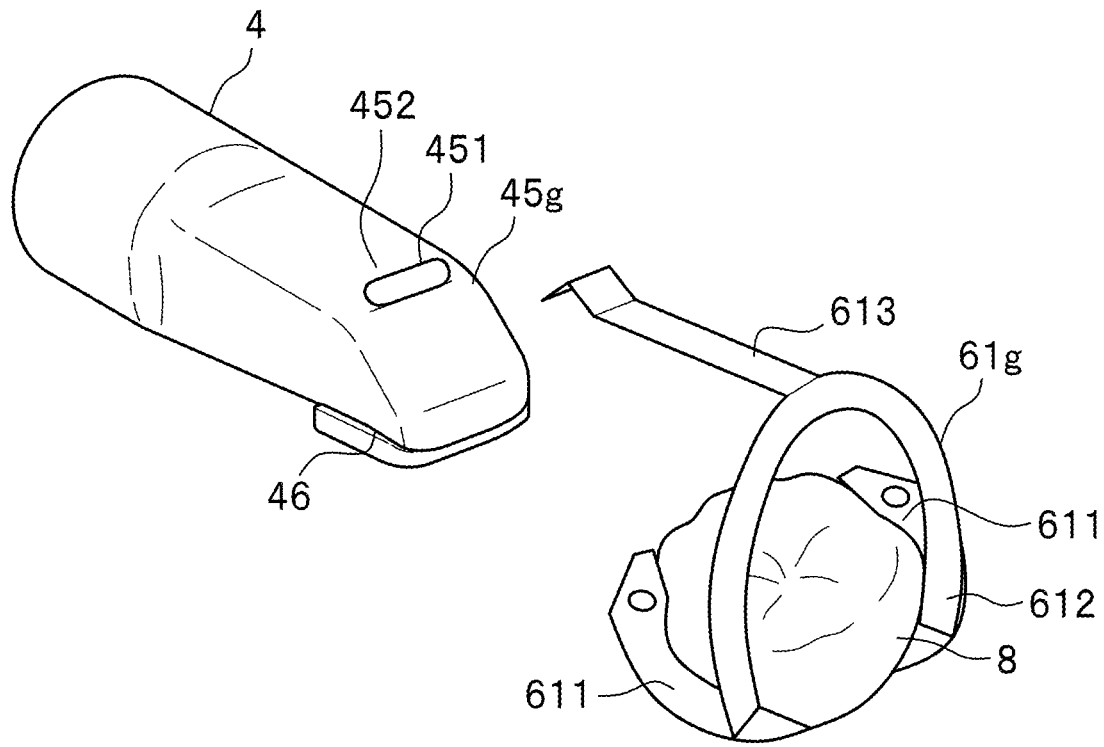
FIGS. 8A to 8B are each a schematic diagram showing a configuration example of a tooth fixer used in the optical coherence tomography image generation device of FIGS. 4A to 4D, showing the third configuration example of a tooth fixer using a rubber dam clamp.
Figure 8B:
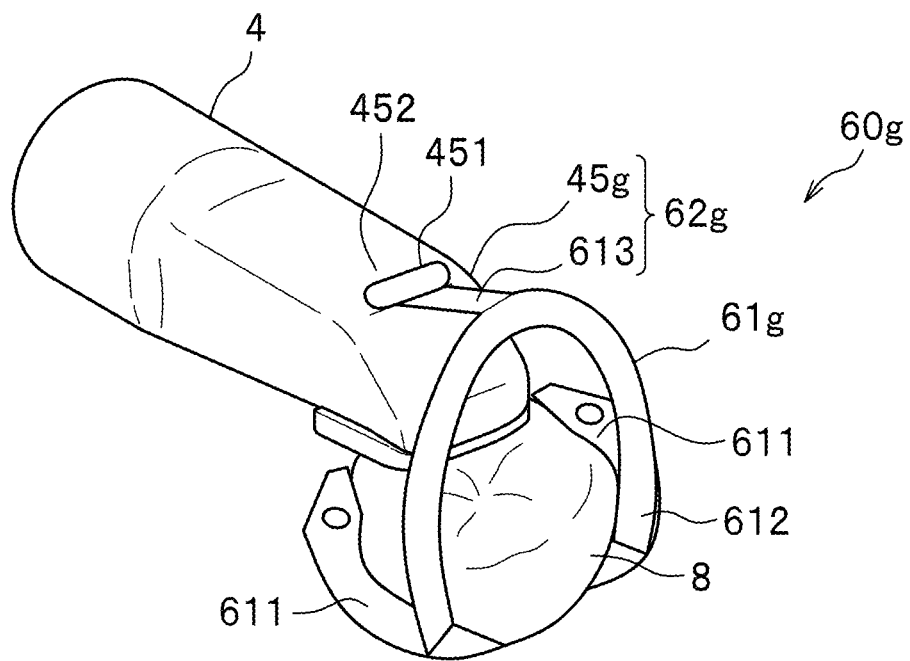

The tooth fixer 60g, shown in disassembled form in FIGS. 8A and 8B, includes a tooth fixation holder 61g, which is a fixation tool, and a probe holder 62g. FIG. 8A shows the tooth fixation holder 61g, which fixes the tooth 8. FIG. 8B shows the state where the probe 4 is connected and fixed to the tooth fixation holder 61g. The tooth fixation holder 61g has the same configuration as the tooth fixation holder 61f of FIGS. 7A to 7C, but the lock pin 613 directly engages with the tip 45g of the probe 4 and functions as the probe holder 62g.

The probe 4 is provided with an opening 451 in the upper part of the tip 45g, and a recessed engagement part 452 is provided on the back side of the upper part of the opening 451 to hook the lock pin 613 thereon. By pressing down the engaged lock pin 613 at a point close to the connector 612, it is possible to release the engagement of the lock pin 613.

Note that in the type where the lock pin is fitted into the engagement part, it is also possible to use a magnet plate. In addition, in the case of the tooth fixer shown in FIGS. 6A to 8B, the probe 4 is assumed to be inserted from the side, but it is also acceptable to use the tooth fixer in which the probe 4 is inserted from the fitting side as shown in FIG. 5B.

Figure 9A:
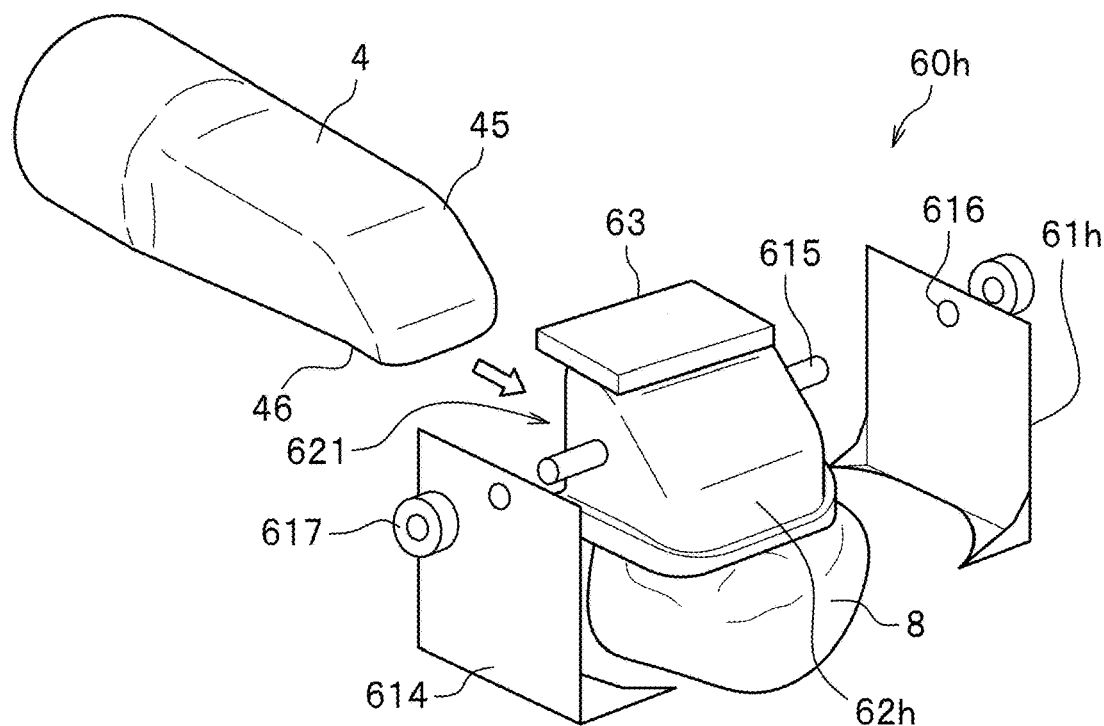
FIGS. 9A to 9B are each a schematic diagram showing a configuration example of a tooth fixer used in the optical coherence tomography image generation device of FIGS. 4A to 4D, showing the fourth configuration example of a tooth fixer using a rubber dam clamp.
Figure 9B:
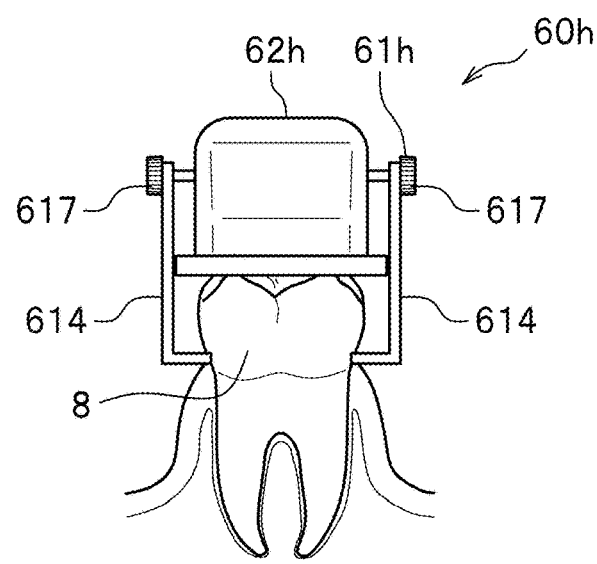

The tooth fixer 60h, shown in disassembled form in FIGS. 9A and 9B, includes a tooth fixation holder 61h, which is a fixation tool, and a probe holder 62h. FIG. 9A shows the disassembled tooth fixer 60h. FIG. 9B shows the state where the tooth fixer 60h has fixed the tooth 8.

The tooth fixation holder 61h has a pair of clamps 614 that clamp both side surfaces of the tooth 8, which is the measurement target, and is configured to freely open, close, and clamp the pair of clamps 614 by the holding force of a screw.

The probe holder 62h has an opening window 621 provided therein. In the tooth fixation holder 61h, a pair of clamps 614 is fixed to the probe holder 62h using screws. For example, male screws 615 are provided on both the left and right sides of the probe holder 62h, and each of these male screws 615 is inserted into a screw hole 616 of the clamps 614 and is screwed into a female screw 617, connecting the tooth fixation holder 61h with the probe holder 62h. Alternatively, female screws can be provided on both the left and right sides of the probe holder 62h, and the male screws can be screwed into the female screws through the screw holes 616 of the clamps 614, connecting the tooth fixation holder 61h with the probe holder 62h.

As shown in FIG. 9A, the tooth fixer 60h may include an opposing tooth fitting part 63. The opposing tooth fitting part 63 is formed on the probe holder 62h and fits with the opposing tooth of the measurement target tooth 8. Here, the opposing tooth fitting part 63 is formed in a flat plate shape. By the patient biting the opposing tooth fitting part 63 with the opposing tooth, the probe holder 62h is securely fixed to the tooth 8 via the opposing tooth and the opposing tooth fitting part 63, thereby enabling the probe 4 to be securely fixed to the tooth 8.

Third Embodiment

Figure 10:
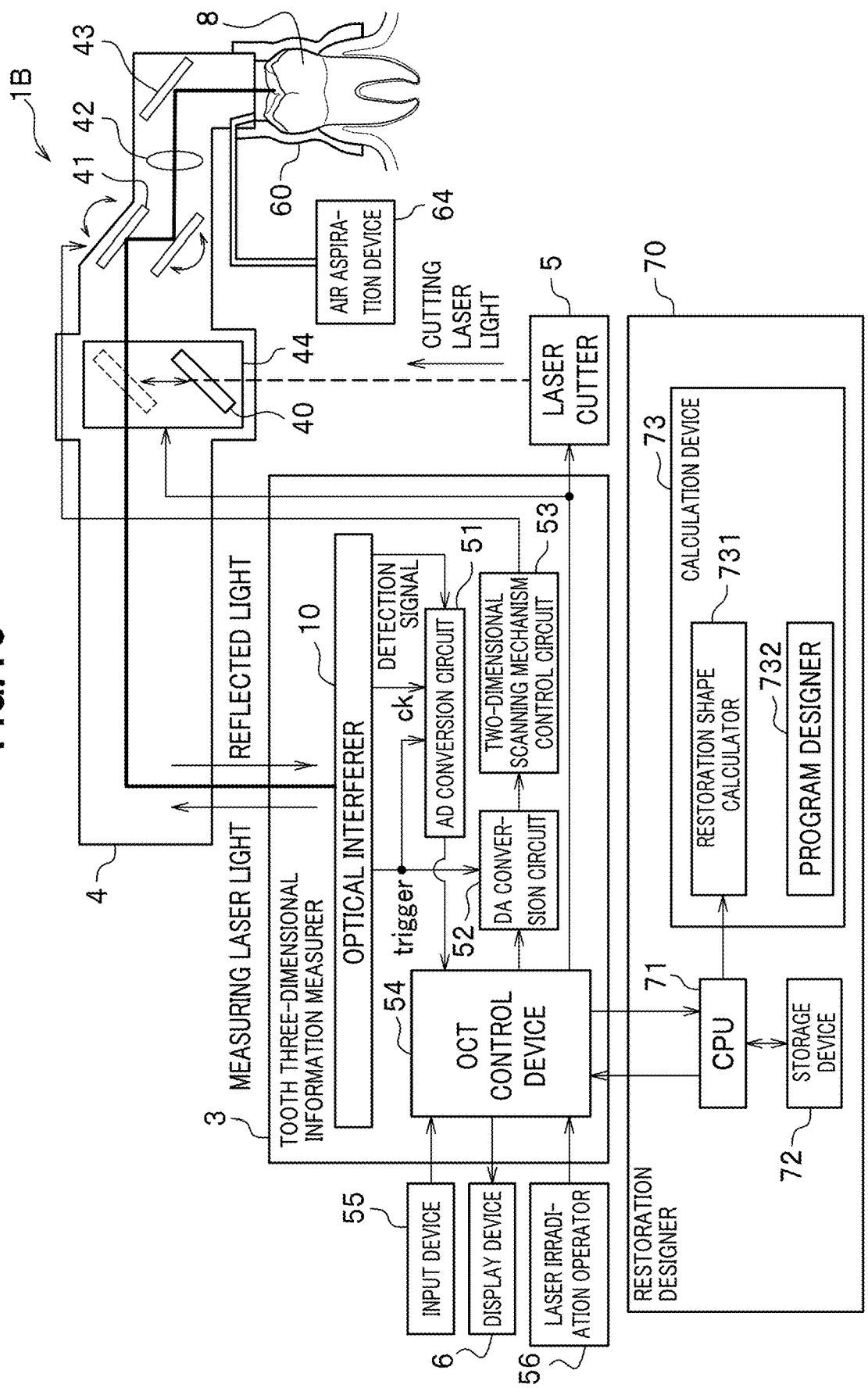
FIG. 10 is a schematic diagram showing the configuration of the optical coherence tomography image generation device according to the third embodiment of the present invention.

Next, the optical coherence tomography image generation device according to the third embodiment of the present invention is described with reference to FIG. 10. Note that the same reference numerals are given to the components identical to the optical coherence tomography image generation device 1 shown in FIG. 1, and their descriptions are omitted.

The optical coherence tomography image generation device 1B includes a tooth three-dimensional information measurer 3, a probe 4, a laser cutter 5, a tooth fixer 60, and a restoration designer 70. The restoration designer 70 designs dental restorations based on the tooth three-dimensional information measured by the tooth three-dimensional information measurer 3. The tooth three-dimensional information measurer 3 measures the brightness information on each of the three-dimensional coordinates of the tooth as the tooth three-dimensional information. The OCT control device 54 outputs the brightness information on each of the three-dimensional coordinates of the tooth to the restoration designer 70.

Figure 11A:
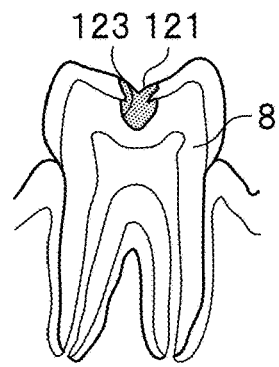
FIGS. 11A to 11C are each an explanatory diagram of the restoration designer of the optical coherence tomography image generation device of FIG. 10, where
Figure 11B:
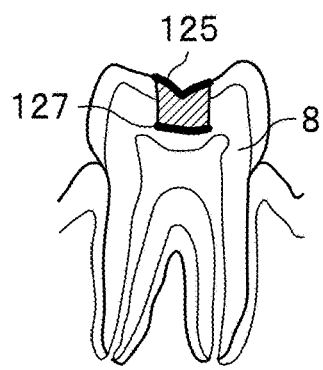
Figure 11C:
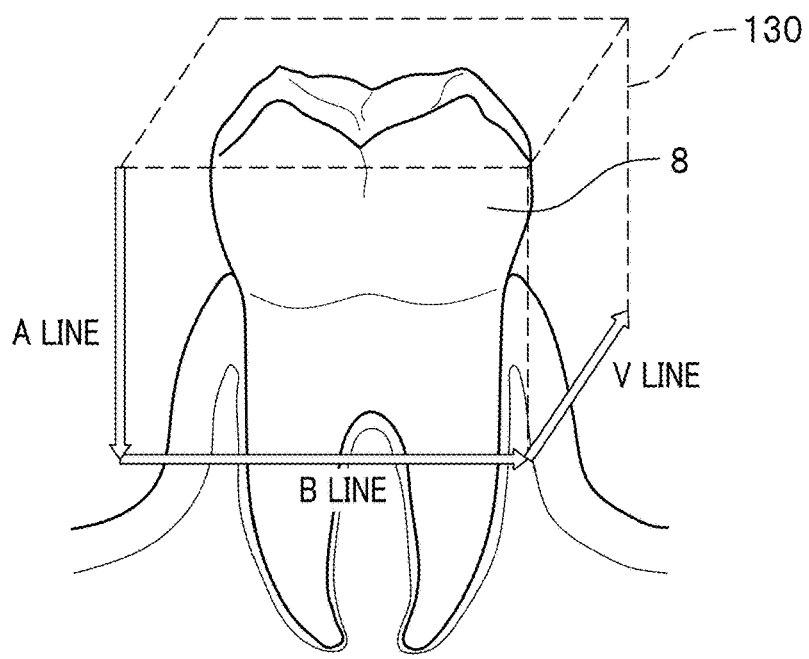

The restoration designer 70 includes a CPU 71, a storage device 72, and a calculation device 73. The storage device 72 stores the pre-cut tooth surface shape 125 (see FIG. 11B) and the restoration-filled surface shape 127 (see FIG. 11B). The pre-cut tooth surface shape 125 is the surface shape of a tooth previously measured by the tooth three-dimensional information measurer 3 before cutting the measurement target tooth using the laser cutter 5. As shown in FIG. 11A, if there is a caries fissure 123 or the like in the measurement target tooth 8, it is necessary to restore assuming the pre-caries shape 121. In that case, the operator may temporarily fill the caries area with a transparent type of silicone impression material or resin, for example, and smooth the surface. The operator also adjusts the surface shape by fitting with the opposing tooth as necessary. Afterward, the tooth three-dimensional information measurer 3 measures the pre-cut tooth surface shape 125 and stores it in the storage device 72. FIG. 11C is an example of a measurement region 130 when measuring the pre-cut tooth surface shape.

Note that as another method to restore assuming the pre-caries shape 121, it is also acceptable to restore using data that has been shape corrected with CAD software from digital impression data read from an optical three-dimensional scanner.

In the present embodiment, the restoration-filled surface shape 127 is the surface shape of a tooth that has been cut for restoration filling. The calculation device 73 designs a restoration creation program based on the pre-cut tooth surface shape 125 and the restoration-filled surface shape 127 stored in the storage device 72. The calculation device 73 includes a restoration shape calculator 731 and a program designer 732. The restoration shape calculator 731 calculates the shape of the restoration based on the pre-cut tooth surface shape 125 and the restoration-filled surface shape 127. The program designer 732 designs a restoration creation program for creating the restoration. The restoration designer 70 outputs the design information of the restoration (restoration creation program) and the like to the OCT control device 54.

In the present embodiment, the optical coherence tomography image generation device 1B includes a laser irradiation operator 56. The laser irradiation operator 56 operates the laser irradiation of the laser cutter 5.

The laser irradiation operator 56 includes a laser operation switch that performs irradiation position control operations and laser irradiation control by mouse operation or joystick operation.

The operator checks the tooth image displayed on the display device 6, obtained by measurement through the tooth three-dimensional information measurer 3. The operator manipulates the laser irradiation timing and laser irradiation position for the laser cutter 5 using the laser irradiation operator 56. The restoration-filled surface shape 127 is finally determined by alternating steps (or simultaneous steps) of the operator checking the tooth surface shape on the online screen, and laser cutting by the laser irradiation operator 56. Here, the term "online screen" refers to the preview screen that displays the information acquired with probe 4 in real time as a movie on the display device 6.

Here, a supplementary explanation will be given of the alternating steps (or simultaneous steps). When the optical coherence tomography image generation device 1B includes the optical path switcher 44 as shown in FIG. 10, for example, it performs a step of alternating between checking the tooth surface shape and laser cutting. Also, the optical coherence tomography image generation device 1B performs the alternating steps even when it includes the optical path switcher 44a shown in FIG. 3A instead of the optical path switcher 44. Furthermore, the optical coherence tomography image generation device 1B performs the alternating steps even when, instead of the optical path coaxializer 40 and the optical path switcher 44, it includes the optical path coaxializer 40A shown in FIG. 3B, and it generates measuring laser light and cutting laser light in a time division manner and makes them alternately incident from directions orthogonal to each other on the optical path coaxializer 40A.

On the other hand, the optical coherence tomography image generation device 1B simultaneously performs checking the tooth surface shape and laser cutting when, instead of the optical path coaxializer 40 and the optical path switcher 44, it includes the optical path coaxializer 40A shown in FIG. 3B, and it generates measuring laser light and cutting laser light in a continuous manner and makes them simultaneously incident from directions orthogonal to each other on the optical path coaxializer 40A.

The display device 6 displays the optical coherence tomographic image generated by the OCT control device 54 and is also used as a display device for the restoration designer 70. The image of the tooth surface shape displayed on the display device 6 is one of a 3D image, an en-face image, and a cross-sectional image, or a combination thereof. The preview screen is not displayed on the display device 6 during laser irradiation, and the operator can be made to remember it as an afterimage. Alternatively, the preview screen before irradiation may be displayed on the display device 6 with a delay during laser irradiation.

Figure 12:
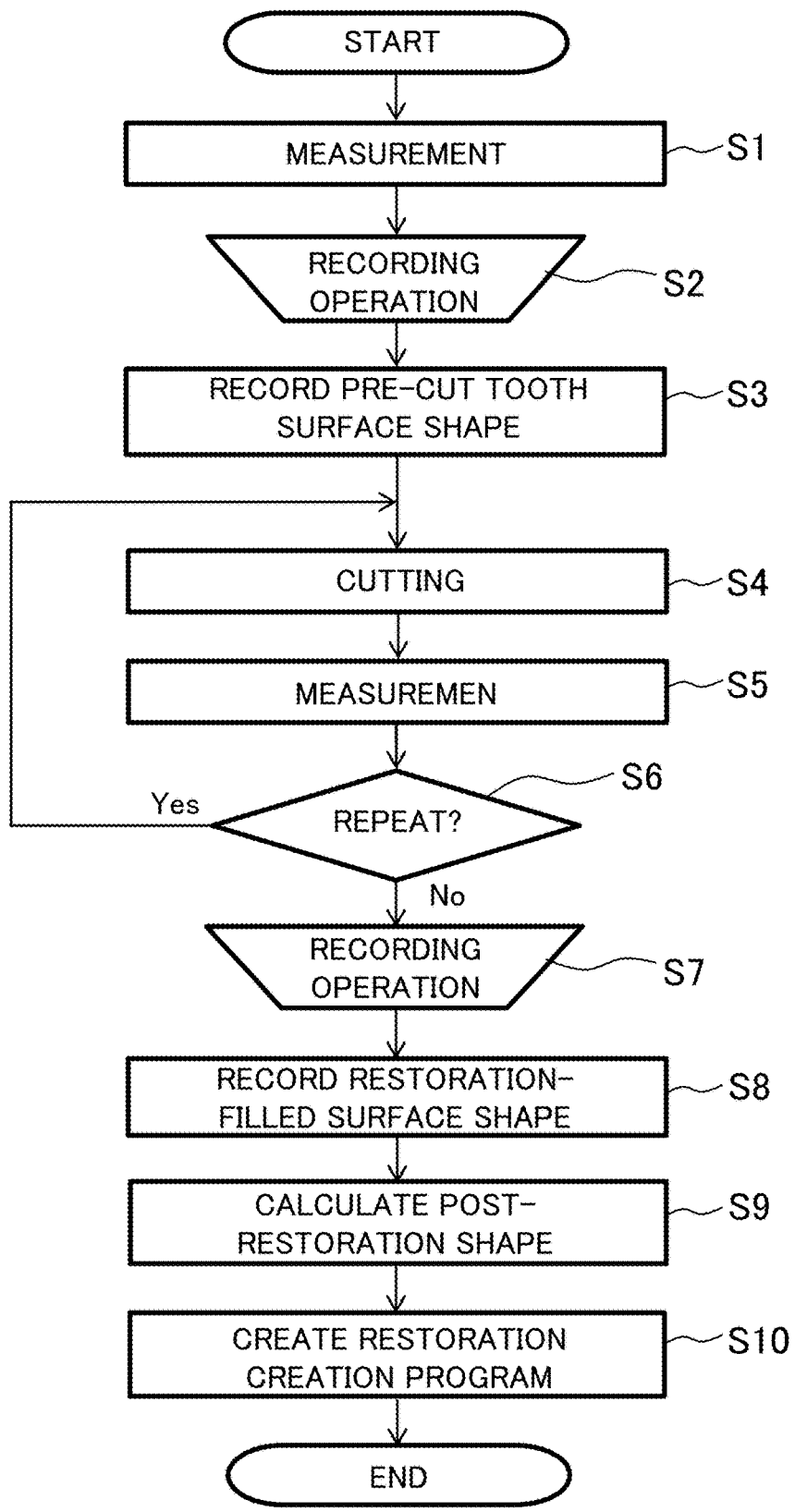
FIG. 12 is a flowchart showing the flow of manual cutting processing by the optical coherence tomography image generation device according to the third embodiment of the present invention.

Next, the flow of manual cutting processing by the optical coherence tomography image generation device 1B will be described, referring to FIG. 12. First, the optical path switcher 44 switches the optical path of the output laser light to the optical path of the measuring laser light. The tooth three-dimensional information measurer 3 performs measurements (step S1), and the OCT control device 54 outputs OCT images and measurement data to the restoration designer 70. Then, the operator performs a recording operation of the tooth surface before cutting through the input device 55 (step S2). The CPU 71 of the restoration designer 70 records the pre-cut tooth surface shape in the storage device 72 (step S3).

Then, the operator performs the ON operation and position control operation of the laser irradiation operator 56. The two-dimensional scanning mechanism control circuit 53 of the tooth three-dimensional information measurer 3 outputs a motor drive signal to drive or stop the motor of the two-dimensional scanning mechanism 41 in synchronization with the cutting information sent from the laser irradiation operator 56 via the OCT control device 54. After the optical path switcher 44 has switched the optical path of the output laser light to the optical path of the cutting laser light, the laser cutter 5 cuts a predetermined site of the tooth (step S4).

Then, when the operator performs the OFF operation of the laser irradiation operator 56, the optical path switcher 44 switches the optical path of the output laser light to the optical path of the measuring laser light. Then, the tooth three-dimensional information measurer 3 performs measurements (step S5). Then, the operator checks the cut site of the tooth displayed on the screen and determines whether to repeat the cutting operation (step S6). If the cutting operation is to be repeated (step S6: Yes), return to step S4, and the operator performs the ON operation and position control operation of the laser irradiation operator 56.

On the other hand, when the cutting operation is to be finished (step S6: No), the operator performs a recording operation of the tooth surface at this point through the input device 55 (step S7). As a result, the CPU 71 of the restoration designer 70 records the restoration-filled surface shape in the storage device 72 (step S8). Then, the restoration shape calculator 731 of the calculation device 73 calculates the post-restoration shape (step S9), and the program designer 732 creates a restoration creation program (step S10).

Figure 13A:
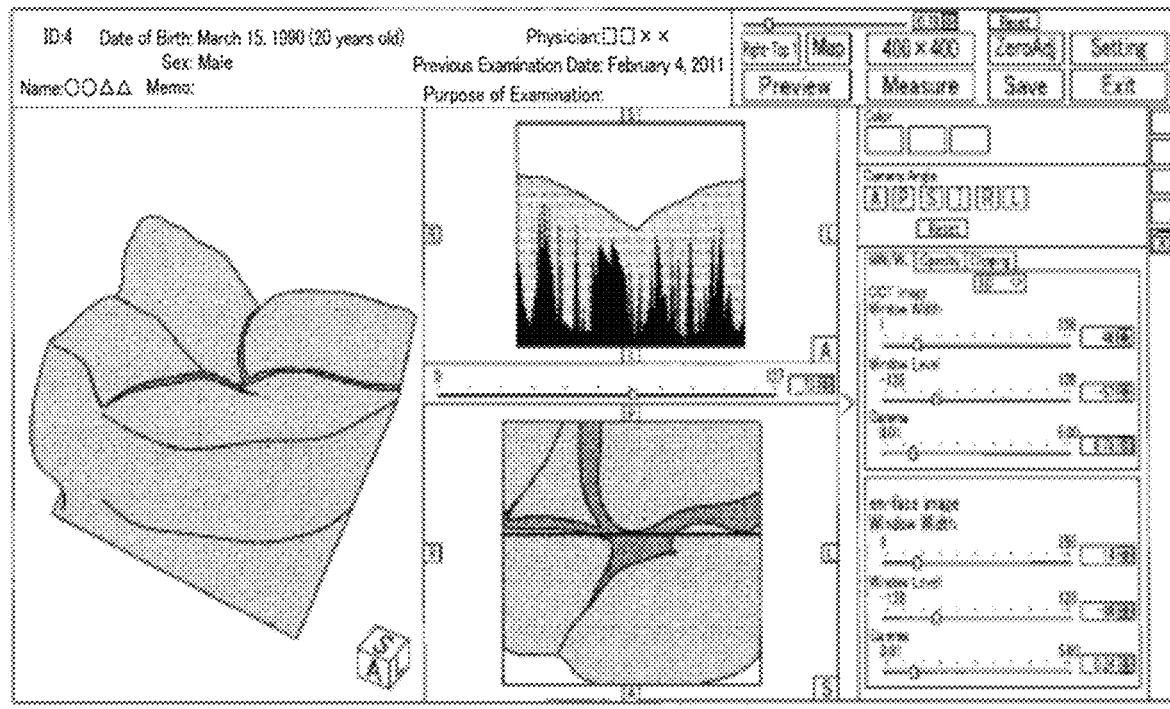
FIGS. 13A and 13B are each an example of a screen display that the operator checks during manual cutting processing by the optical coherence tomography image generation device of FIG. 10, where
Figure 13B:
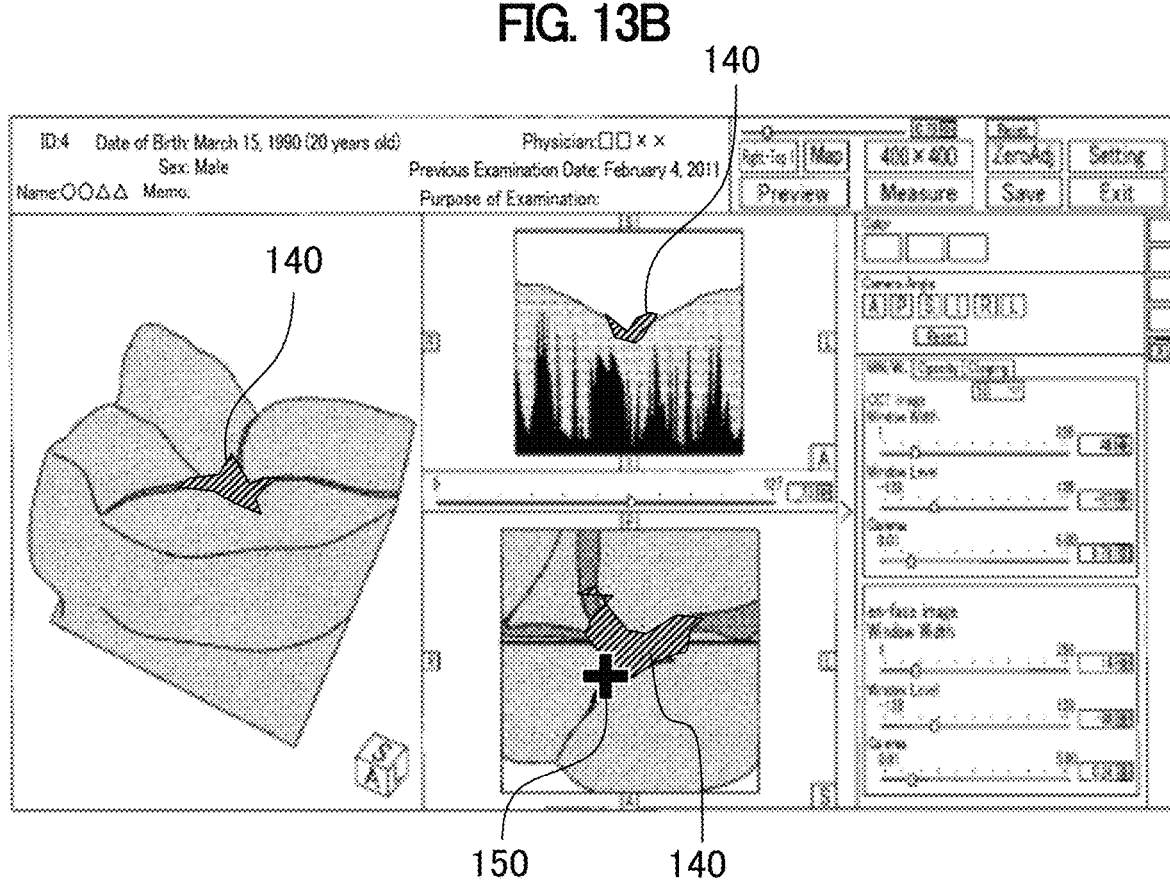

FIG. 13A is an example of a pre-cut screen display that the operator checks, while FIG. 13B is an example of a post-cut screen display. The post-cut screen display shows a cut site 140.

In the present embodiment, the operator manipulates the cutting irradiation position with a joystick while checking changes in the tooth surface shape caused by laser irradiation on an online screen. At this time, as shown in FIG. 13B, a cursor 150 can be provided on the en-fac image. The cursor position is allocated on the screen to match the measurement coordinates (that is, the laser irradiation coordinates). The operator moves the cursor position while checking it with joystick operation and performs laser irradiation. Note that the cursor 150 can also be provided on the 3D image.

Fourth Embodiment

Figure 14:
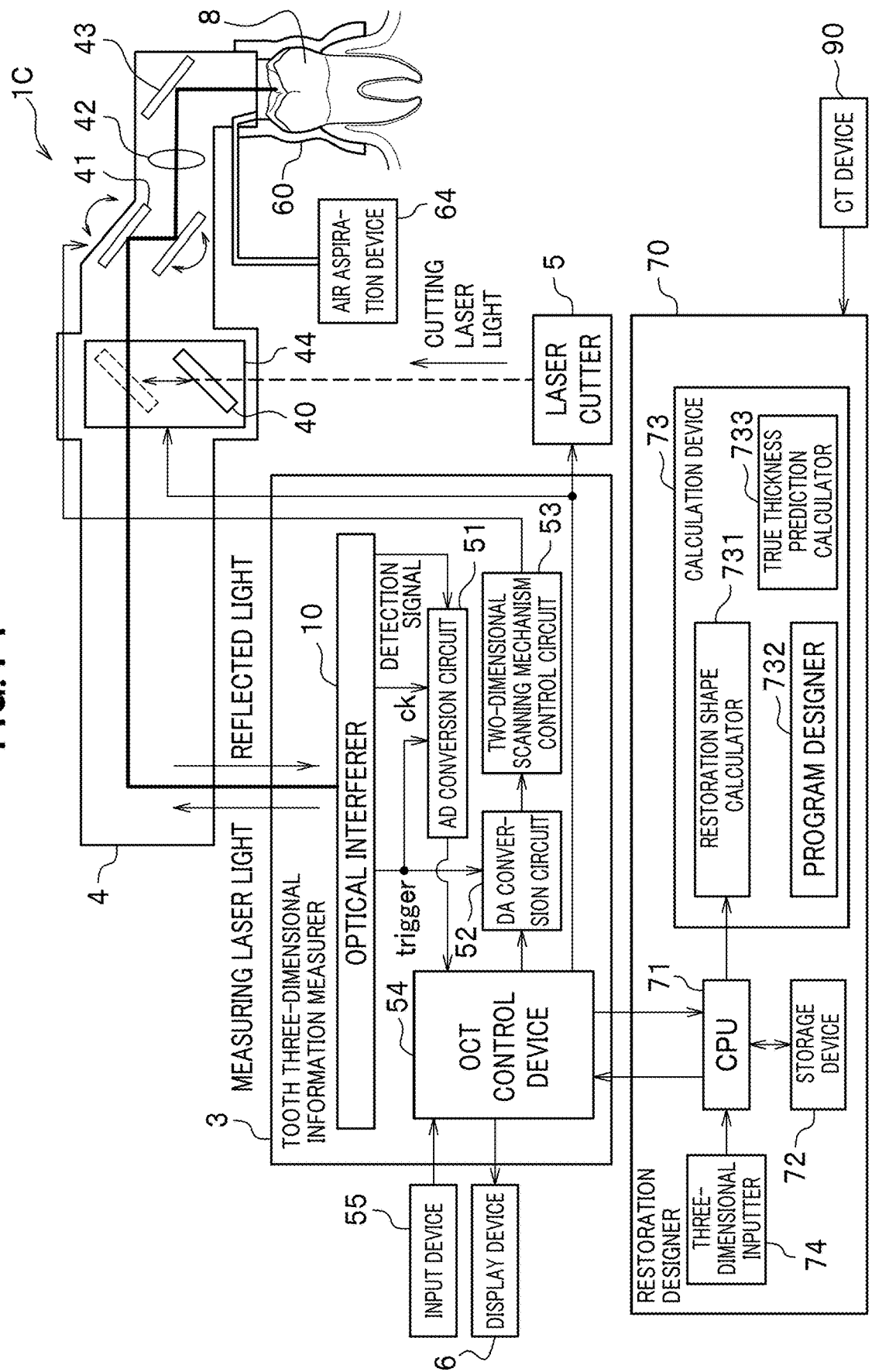
FIG. 14 is a schematic diagram showing the configuration of the optical coherence tomography image generation device according to the fourth embodiment of the present invention.

Next, the optical coherence tomography image generation device according to the fourth embodiment of the present invention is described with reference to FIG. 14. Note that the same reference numerals are given to the components identical to the optical coherence tomography image generation device 1B shown in FIG. 10, and their descriptions are omitted.

The optical coherence tomography image generation device 1C includes a tooth three-dimensional information measurer 3, a probe 4, a laser cutter 5, a tooth fixer 60, and a restoration designer 70.

The tooth three-dimensional information measurer 3 measures the brightness information on each of the three-dimensional coordinates of the tooth as the tooth three-dimensional information. The restoration designer 70 includes a CPU 71, a storage device 72, and a calculation device 73. The storage device 72 stores the pre-cut tooth surface shape 125 and the restoration-filled surface shape 127. The pre-cut tooth surface shape 125 is the surface shape of a tooth previously measured by the tooth three-dimensional information measurer 3 before cutting the tooth to be measured by the laser cutter 5. In the present embodiment, the restoration-filled surface shape 127 is not the surface shape of a cut tooth, but the surface shape of a tooth to be cut which is created by the calculation device 73 based on the input of the three-dimensional inputter 74 described later.

In the present embodiment, the restoration designer 70 includes a three-dimensional inputter 74.

The three-dimensional inputter 74 allows the operator to input a three-dimensional cutting range on the screen. Before cutting the measurement target tooth with the laser cutter 5, the operator checks the tooth image displayed on the display device 6 by the measurement of the tooth three-dimensional information measurer 3 on an offline screen, and inputs the cutting range using the three-dimensional inputter 74. The offline screen means the process of acquiring information online and storing it in the storage, and temporarily exiting the online state, and reading that information to display a still image. The operation of the three-dimensional inputter 74 is performed by a mouse operation or a touch switch provided on the display device 6.

In the present embodiment, the calculation device 73 designs a restoration creation program by creating the restoration-filled surface shape 127 from the cutting range inputted from the three-dimensional inputter 74. Additionally, the calculation device 73 further designs a tooth cutting program. The tooth cutting program is a program to laser-cut the tooth to be cut. The cut part of the tooth serves as a pedestal for the restoration in the tooth when filling with the restoration. The program designer 732 designs the tooth cutting program in addition to the restoration creation program.

The restoration designer 70 outputs the design information of the restoration (restoration creation program) and the tooth cutting information (tooth cutting program) to the OCT control device 54.

The OCT control device 54 of the tooth three-dimensional information measurer 3 controls the laser cutter 5 by inputting the cutting information from the restoration designer 70. The two-dimensional scanning mechanism control circuit 53 of the tooth three-dimensional information measurer 3 outputs a motor drive signal to drive or stop the motor of the two-dimensional scanning mechanism 41 in synchronization with the cutting information (tooth cutting program) sent from the restoration designer 70 via the OCT control device 54.

Figure 15A:
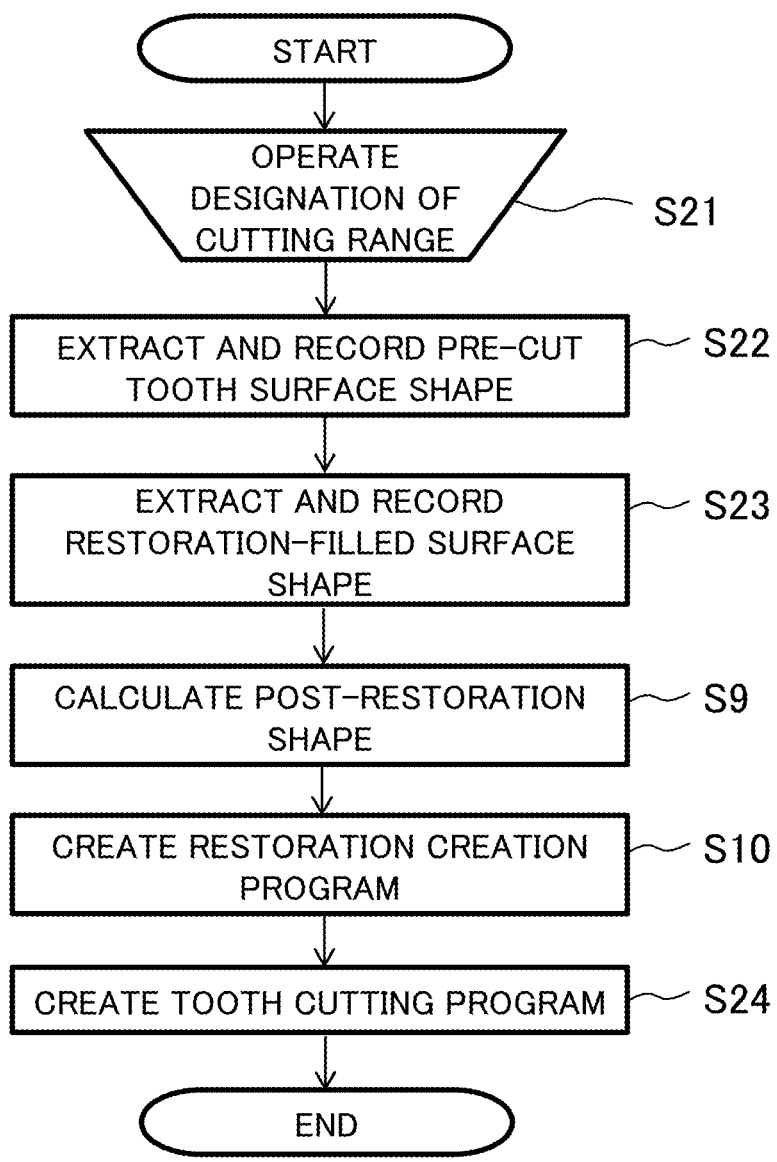
FIGS. 15A and 15B are each an explanatory diagram of the operation of the optical coherence tomography image generation device according to the fourth embodiment of the present invention, where

Next, the flow of processing by the optical coherence tomography image generation device 1C will be described, referring to FIG. 15A. First, the optical path switcher 44 switches the optical path of the output laser light to the optical path of the measuring laser light, and the tooth three-dimensional information measurer 3 performs measurements, and the OCT control device 54 outputs OCT images and measurement data to the restoration designer 70. Then, the operator checks the tooth displayed on the screen and performs an operation of designating the cutting range using the three-dimensional inputter 74 (step S21). The restoration designer 70 extracts the pre-cut tooth surface shape by the three-dimensional inputter 74, and records it in the storage device 72 by the CPU 71 (step S22). Further, the restoration designer 70 extracts the restoration-filled surface shape by the three-dimensional inputter 74, and records it in the storage device 72 by the CPU 71 (step S23).

Then, the restoration shape calculator 731 of the calculation device 73 calculates the post-restoration shape (step S9), and the program designer 732 creates a restoration creation program (step S10). In addition, the program designer 732 of the calculation device 73 creates a tooth cutting program (step S24). Then, the restoration designer 70 sends the tooth cutting program as cutting information to the OCT control device 54. As a result, the OCT control device 54 controls the laser cutter 5 based on the tooth cutting program. At this time, after the optical path switcher 44 has switched the optical path of the output laser light to the optical path of the cutting laser light, the laser cutter 5 cuts a predetermined site of the tooth.

Figure 15B:
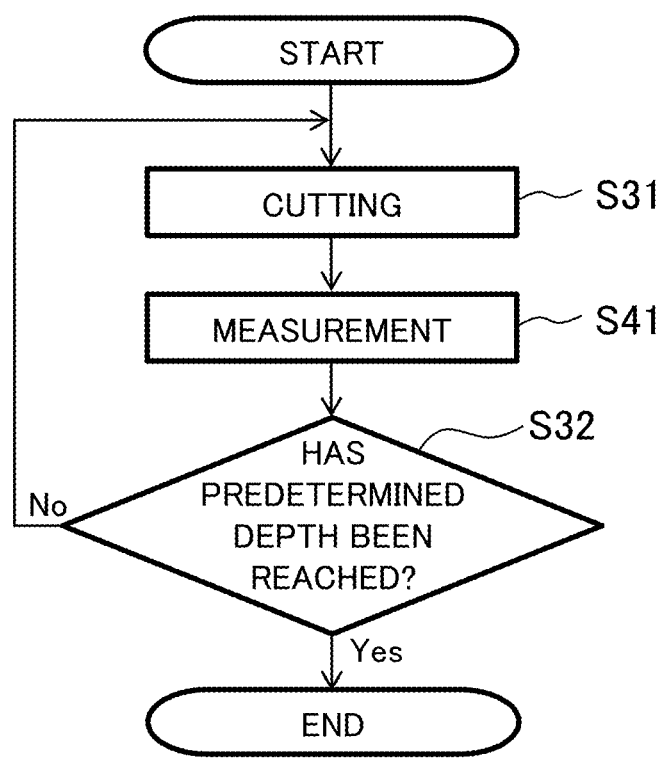

Here, referring to FIG. 15B, two concrete examples of the flow of automatic cutting processing by the tooth cutting program will be described.

First, in the first concrete example, the OCT control device 54 of the optical coherence tomography image generation device 1C controls the laser cutter 5 to output the cutting laser light at the irradiation output specified by the tooth cutting program. As a result, the laser cutter 5 cuts a predetermined site (step S31). Then, the OCT control device 54 determines whether or not the cutting depth of the tooth has reached the predetermined depth previously specified by the three-dimensional inputter 74 (step S32). Note that whether the predetermined depth has been reached can be determined, for example, by whether the irradiation time of the cutting laser light has reached the time determined by the predetermined depth and irradiation output.

If it is determined that the predetermined depth has not been reached (step S32: No), the OCT control device 54 returns to step S31 and continues to control the laser cutter 5 to cut. If it is determined that the predetermined depth has been reached (step S32: Yes), the OCT control device 54 stops the output of the cutting laser light by the laser cutter 5 and ends the process. Note that step S41 will be explained in the second concrete example.

Next, in the second concrete example, the OCT control device 54 controls the laser cutter 5 to output the cutting laser light at an irradiation output specified by the tooth cutting program and to stop after a predetermined time. As a result, the laser cutter 5 cuts a predetermined site (step S31). Then, the OCT control device 54 controls the optical path switcher 44 to switch the optical path of the output laser light to the optical path of the measuring laser light, and controls the tooth three-dimensional information measurer 3 to measure the current depth of the tooth. This allows the tooth three-dimensional information measurer 3 to measure the depth of the tooth (step S41). Then, the OCT control device 54 compares the predetermined depth with the measurement result and determines whether or not the measurement result has reached the predetermined depth (step S32). If it is determined that the predetermined depth has not been reached (step S32: No), the OCT control device 54 returns to step S31 and again controls the laser cutter 5 to output the cutting laser light for a predetermined time. If it is determined that the predetermined depth has been reached (step S32: Yes), the OCT control device 54 stops the output of the cutting laser light by the laser cutter 5 and ends the process.

The tooth cutting program can adopt either the method of the first concrete example or the method of the second concrete example. Teeth, unlike artificial materials, have heterogeneous material properties, so that the amount of laser cutting varies depending on where on the tooth is cut.

Therefore, the accuracy is improved by alternately performing cutting and measuring until the desired predetermined depth is reached, as in the method of the second concrete example.

Figure 16A:
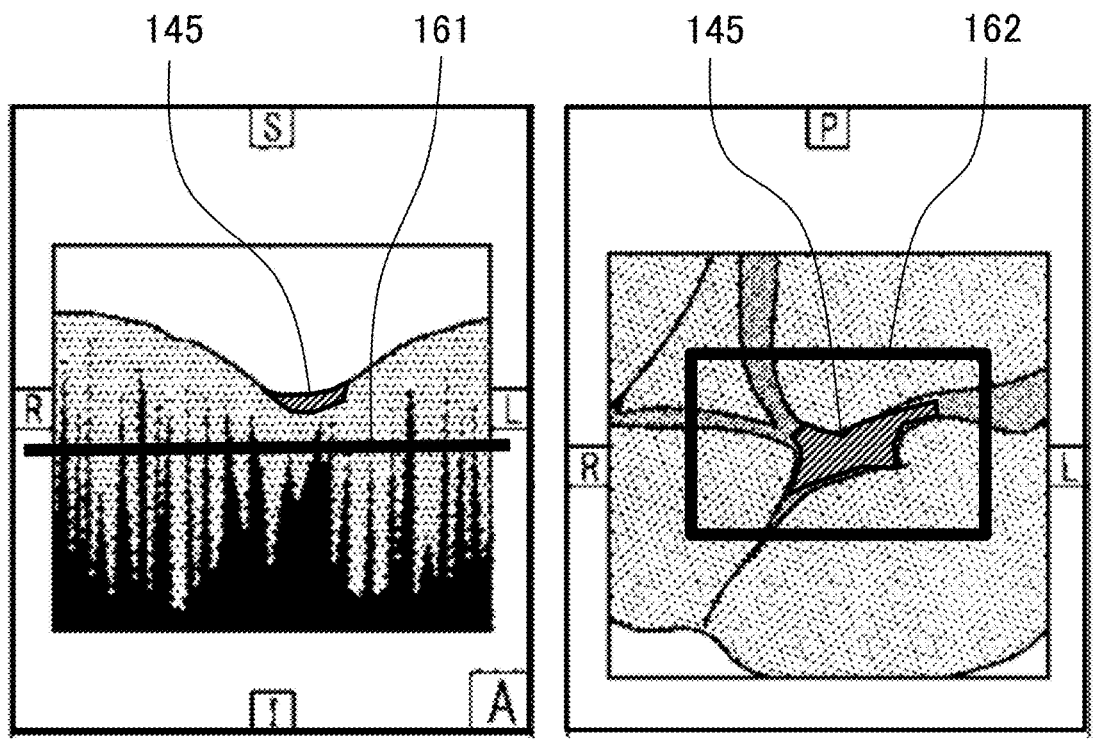
FIGS. 16A and 16B are each a schematic diagram of the cutting range inputted from the three-dimensional inputter of the optical coherence tomography image generation device of FIG. 14, where
Figure 16B:
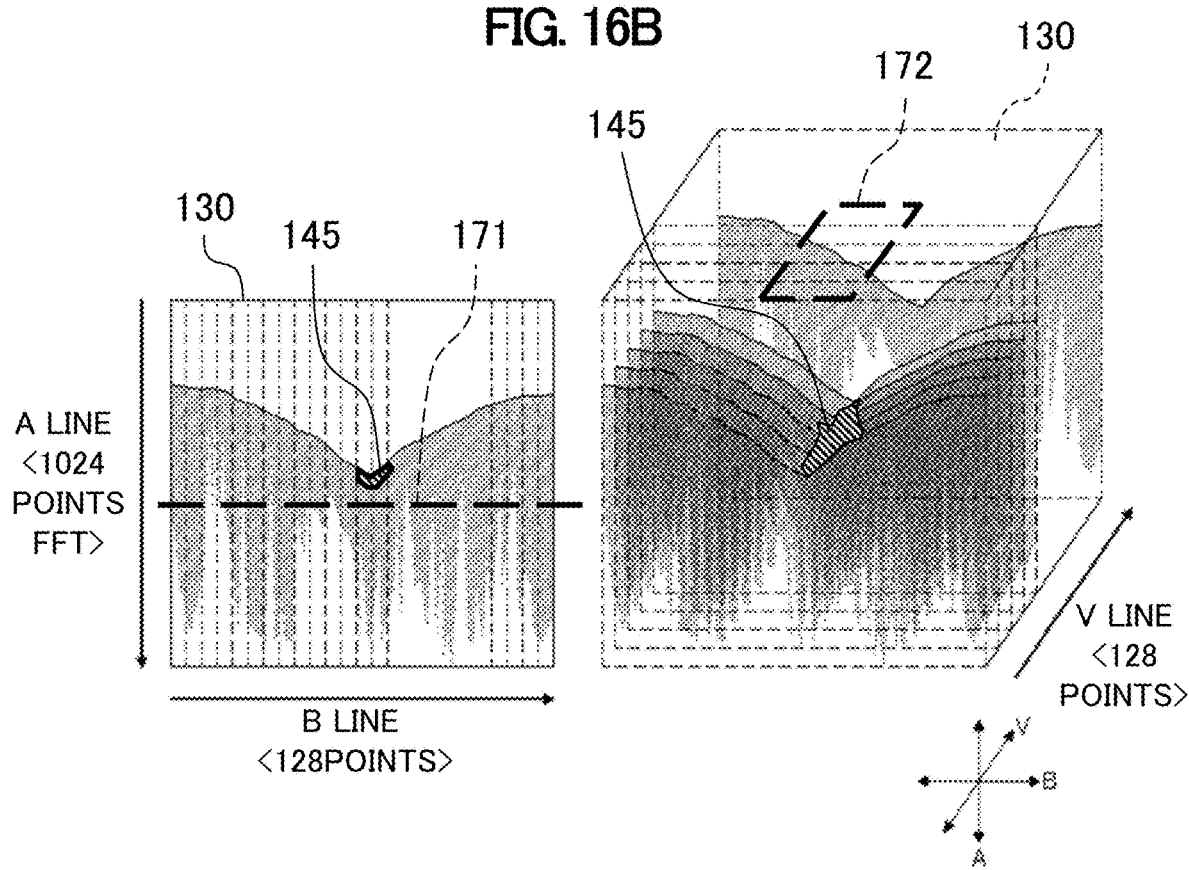

The cutting range inputted from the three-dimensional inputter 74 is a range determined by specifying the cutting region and cutting depth on a two-dimensional plane on a 3D image, en-face image, or cross-sectional image. FIGS. 16A and 16B are each a display example of an offline screen that the operator checks. The en-face image and cross-sectional image in FIG. 16A display the planned cutting site 145, the cutting depth specification line 161, and the cutting region specification frame 162. The 3D image and cross-sectional image in FIG. 16B display the planned cutting site 145, the cutting depth specification line 171, and the cutting region specification frame 172. The operator inputs the cutting region and cutting depth on the offline screen. The cutting region is specified by plotting points with an inputter such as a mouse and enclosing them with straight lines or curves. Similarly, the cutting depth is specified with straight lines or appropriate curves. After cutting, the operator checks the finish on the online image.

The calculation device 73 includes a true thickness prediction calculator 733. The true thickness prediction calculator 733 uses the brightness information on each of the three-dimensional coordinates of the tooth included in the cutting range inputted from the three-dimensional inputter 74 to predict and calculate the true thickness of the cutting range. The true thickness prediction calculator 733 calculates the true thickness using the following formula (1).

True thickness=(Optical distance)/(Refractive index of the tissue)      Formula (1)

Figure 17:
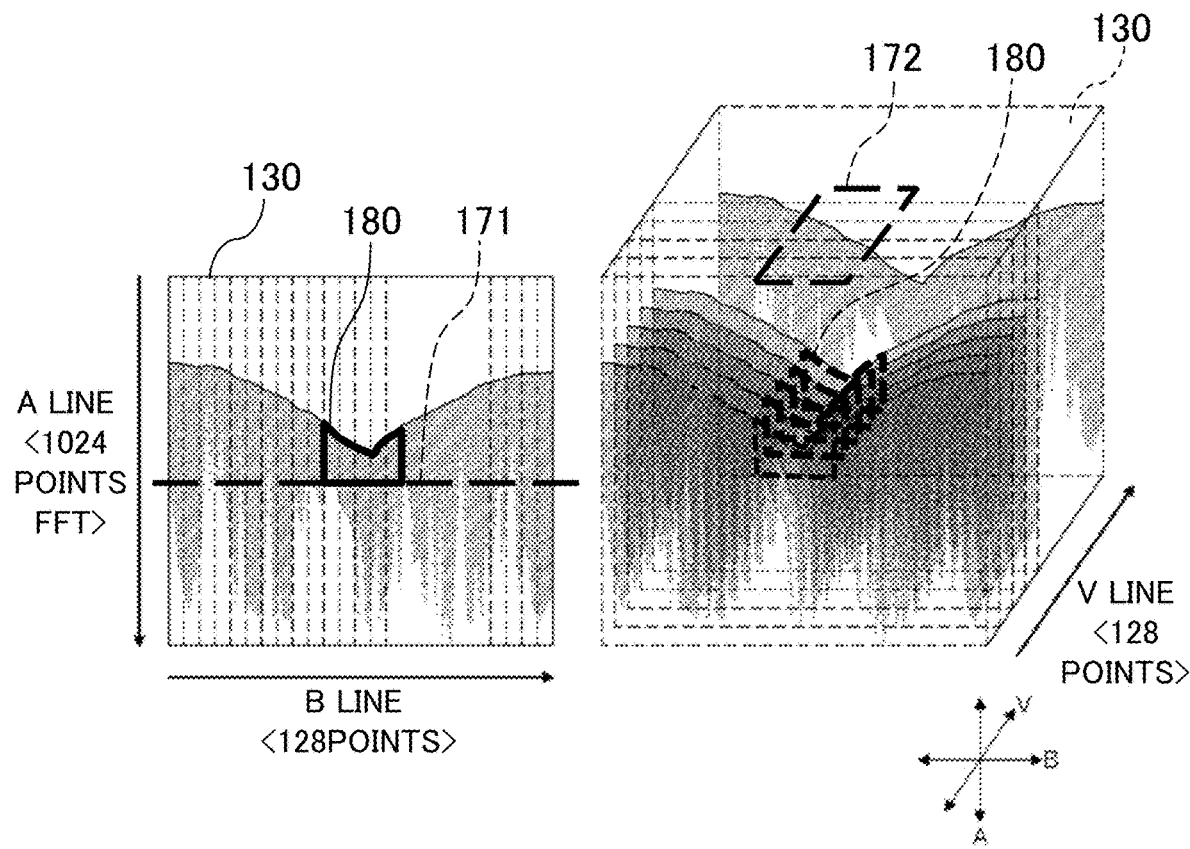
FIG. 17 is a schematic diagram of the brightness information extracted from the cutting range by the true thickness prediction calculator of the optical coherence tomography image generation device of FIG. 14.

FIG. 17 shows the cutting range 180 extracted by the cutting depth specification line 171 and the cutting region specification frame 172 in the measurement region 130. In the measurement of the tooth surface shape, the measuring laser light can accurately capture the surface shape because it measures on air with a refractive index of 1. The refractive index varies within the tooth depending on the material. Therefore, by performing calculations to estimate the true thickness, it is possible to improve the measurement accuracy.

Figure 18A:
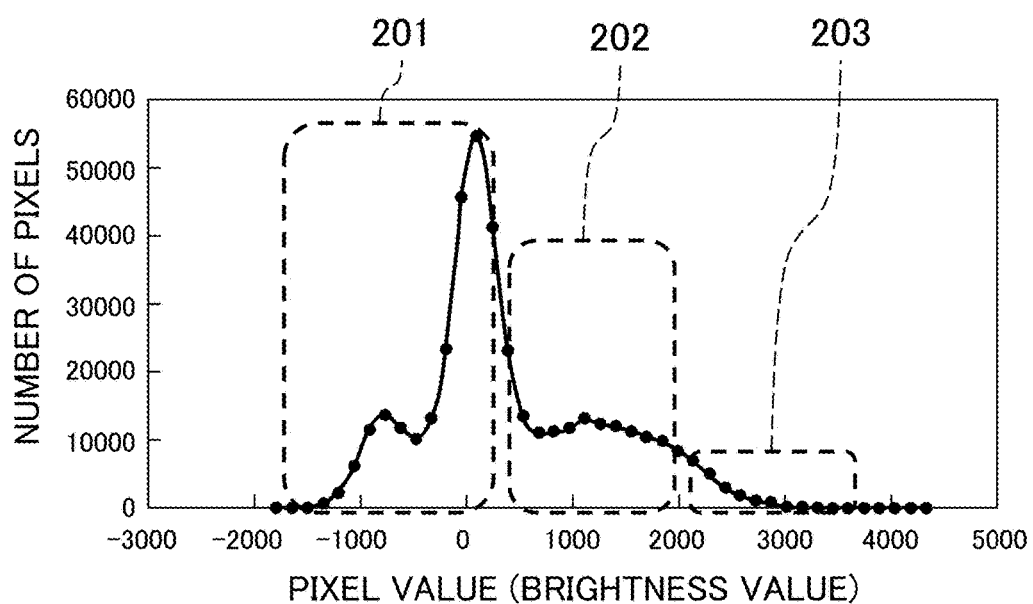
FIGS. 18A and 18B are each an explanatory diagram of tissue identification process of the cutting range by the true thickness prediction calculator of the optical coherence tomography image generation device of FIG. 14, where

The true thickness prediction calculator 733, for example, identifies a tissue in the cutting range from histogram characteristics and brightness information obtained from a cross-sectional image in a depth direction of the tooth, and estimates a true thickness of the cutting range from a refractive index of the identified tissue and the depth on the cross-sectional image in the depth direction. FIG. 18A is an example of a histogram of pixel values created for a certain cross-sectional image A obtained by OCT imaging. As shown in FIG. 18A, most of the pixels can be classified into the first region 201, the second region 202, and the third region 203, encircled by dotted lines.

Upon examining many OCT cross-sectional images taken of teeth, it was found that the following features are almost common. Note that the second region 202 had a brightness value of 500 to 2000. The image of the dark part corresponding to the first region 201 includes images of dentin and other images. The image of the bright part corresponding to the second region 202 primarily includes images of enamel and images of the boundary between enamel and dentin. The image of the very bright part corresponding to the third region 203 includes images of the tooth surface, caries, and missing parts.

Figure 18B:
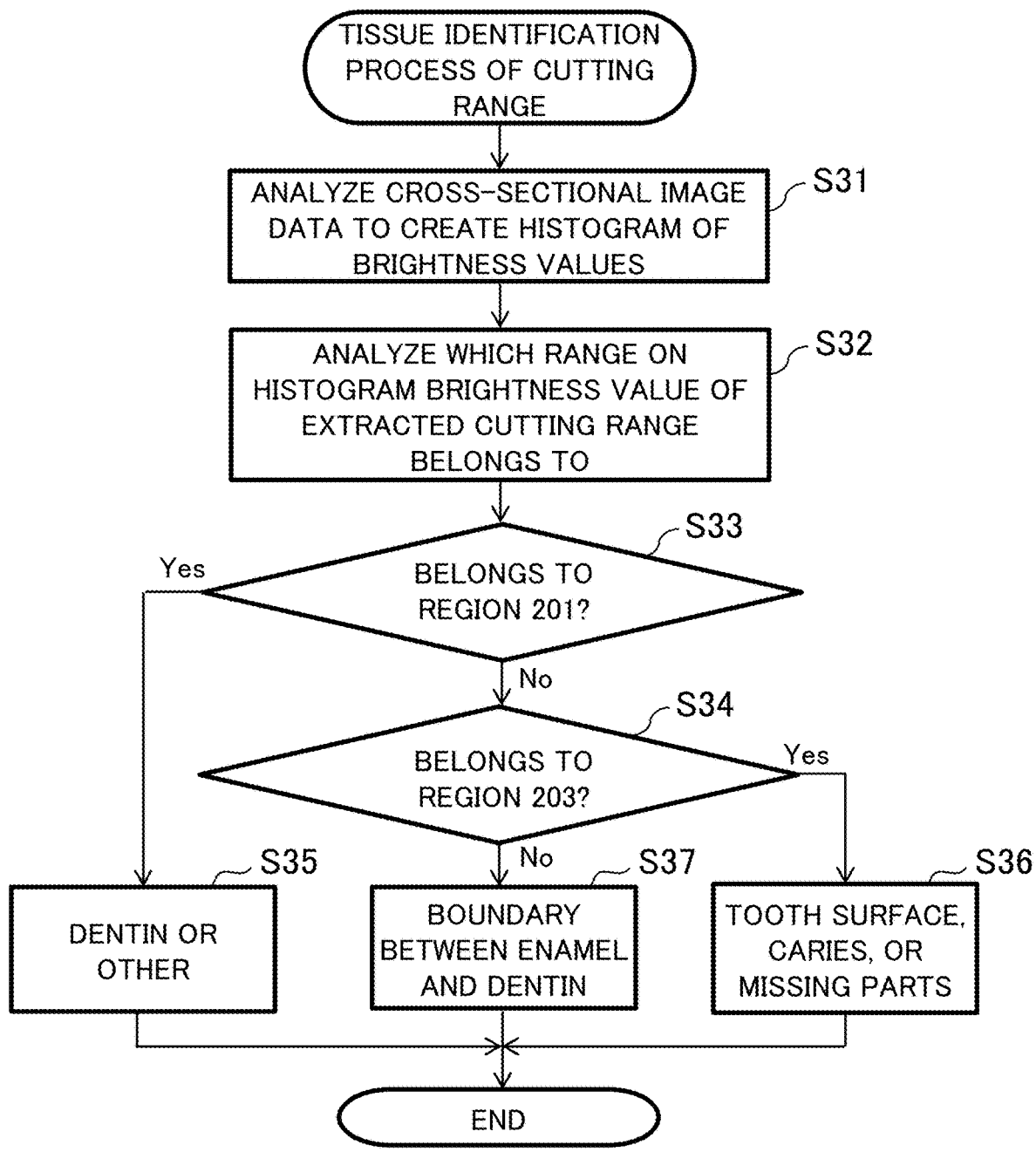

The tissue identification process of the cutting range by the true thickness prediction calculator 733 will be described with reference to FIG. 18B. The true thickness prediction calculator 733 analyzes the cross-sectional image data and creates a histogram of brightness values (step S31). Specifically, it creates a pixel value (brightness value) histogram of all pixels included in the cutting range 180 of the single cross-sectional image on the left in FIG. 17. Then, the true thickness prediction calculator 733 analyzes which range on the histogram the brightness values of the extracted cutting region belong to (step S32).

If the brightness values of the extracted portion of the cutting region belong to the region 201 on the histogram (step S33: Yes), the true thickness prediction calculator 733 determines that the tissue of the extracted portion of the cutting region is dentin or other (step S35). In this case, the true thickness prediction calculator 733 calculates the formula (1) assuming that the refractive index of this tissue is 1.54.

If the brightness values of the extracted portion of the cutting region do not belong to the region 201 on the histogram (step S33: No), but belong to the region 203 (step S34: Yes), the true thickness prediction calculator 733 determines that the tissue of the extracted portion of the cutting region is the tooth surface, caries, or missing parts (step S36). In this case, the true thickness prediction calculator 733 calculates the formula (1) assuming that the refractive index of this tissue is 1.66.

If the brightness values of the extracted portion of the cutting region do not belong to the region 203 on the histogram (step S34: No), the true thickness prediction calculator 733 determines that the tissue of the extracted portion of the cutting region is enamel or the boundary between enamel and dentin (step S37). In this case, the true thickness prediction calculator 733 calculates the formula (1) assuming that the refractive index of this tissue is 1.62.

The true thickness prediction calculator 733 performs the above processing for each cutting range 180 schematically shown in the 3D image on the right of FIG. 17. Note that if the brightness values span across two tissues with a two-tier hierarchy in terms of cutting depth, the true thickness can be estimated separately for each tier, and by adding these, the true thickness can be estimated.

For example, instead of creating a histogram, the true thickness prediction calculator 733 may calculate the true thickness by referring to a CT value, which is an image density value obtained in advance from images taken by an external CT device 90 (see FIG. 14), of the cross-section in the depth direction of the measurement target tooth.

In this case, the true thickness prediction calculator 733 identifies the tissue by referring to CT value information at a position indicated by a predetermined brightness value of the brightness information obtained from a cross-sectional image in the depth direction of the tooth measured by the tooth three-dimensional information measurer 3, and estimates the true thickness of the cutting range from the refractive index of the identified tissue and the depth on the cross-sectional image in the depth direction.

Figure 19A:
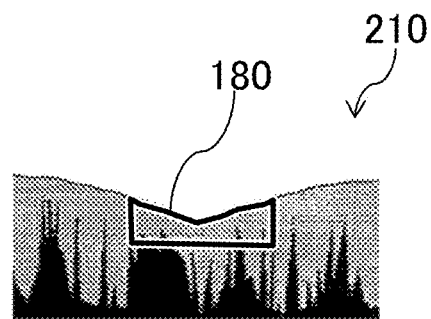
FIGS. 19A and 19B are each a schematic diagram of a modified example of tissue identification process of the cutting range by the true thickness prediction calculator of the optical coherence tomography image generation device of FIG. 14.
Figure 19B:
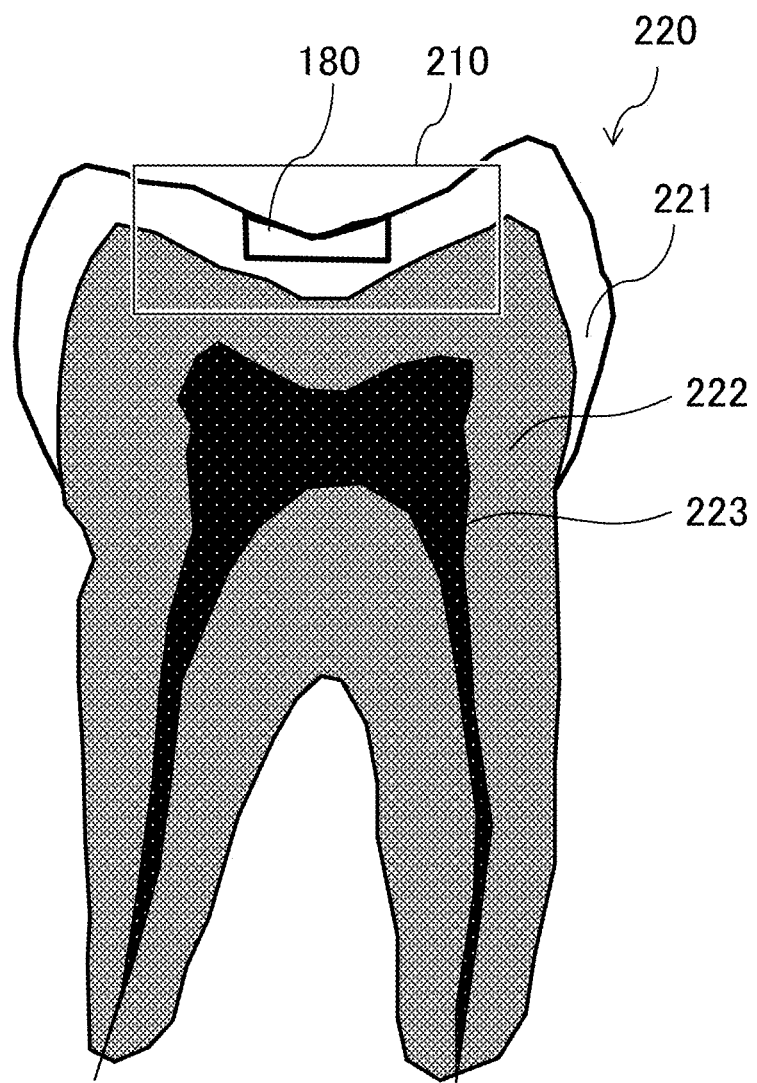

For example, when the true thickness prediction calculator 733 calculates the cutting range 180 in the OCT imaging region 210 shown in FIG. 19A, it identifies the tissue by supplementing the information of the CT value in the X-ray transmission image 220 obtained from the CT device 90, while using the brightness value obtained from the tooth three-dimensional information measurer 3. In the example shown in FIG. 19B, since the cutting range 180 in the OCT imaging region 210 is within the range of enamel 221 in the X-ray transmission image 220, the refractive index of enamel is used to estimate the true depth. Similarly, if the cutting range 180 in the OCT imaging region 210 is within the range of dentin 222, the refractive index of dentin is used, and if it is within the range of pulp 223, the refractive index of pulp is used to estimate the true depth.

Figure 20A:
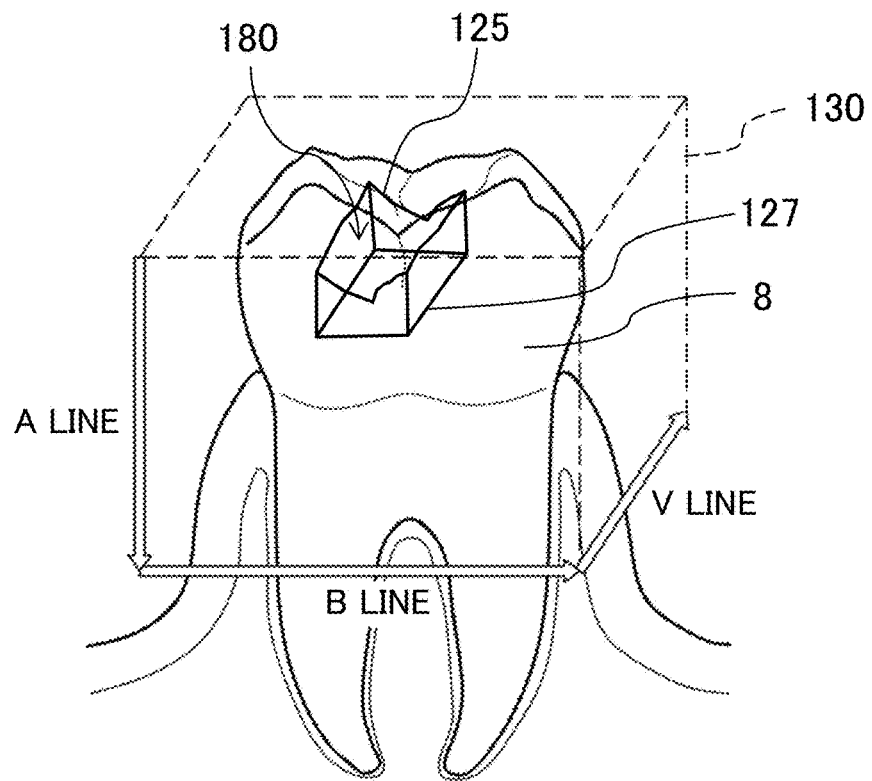
FIGS. 20A and 20B are each a schematic diagram of the irradiation position of the laser light set by the calculation device of the optical coherence tomography image generation device of FIG. 14.
Figure 20B:
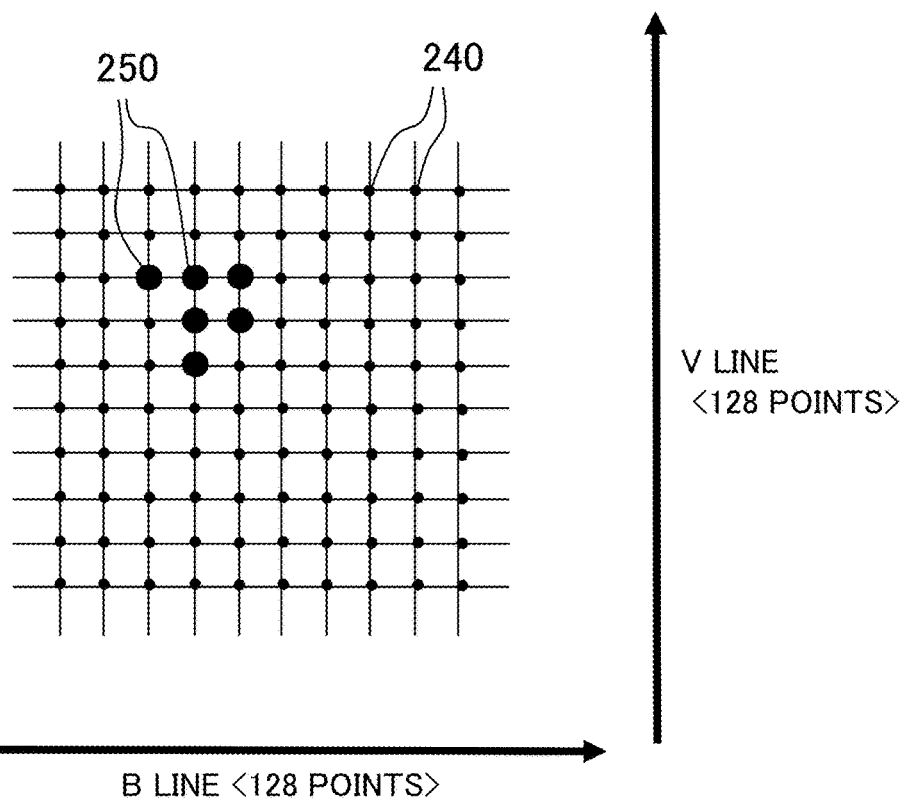

FIG. 20A schematically illustrates a measurement region 130 by the measuring laser light and a cutting range 180 irradiated with cutting laser light. FIG. 20B schematically shows multiple measurement points 240 by the measuring laser light, and irradiation points 250 by the cutting laser light.

The calculation device 73 calculates an irradiation output of the measuring laser light based on the information of the three-dimensional cutting range inputted from the three-dimensional inputter 74. The calculation device 73 calculates the irradiation output for each irradiation point based on the positional information of the three-dimensional cutting range inputted from the three-dimensional inputter 74 and the information on the cutting depth calculated by the true thickness prediction calculator 733.

In this case, the calculation device 73 matches the multiple irradiation points 250 by the cutting laser light, which are set when the two-dimensional scanning mechanism 41 is shared by the cutting laser light and the measuring laser light that have been made coaxial in terms of optical path by the optical path coaxializer 40, to the multiple measurement points 240 by the measuring laser light.

The calculation device 73 assigns the irradiation output of the laser light in the optical axis direction (A-line data) in OCT. By stacking the B-direction scans in direction V, the laser irradiation positions (irradiation points 250) on the B-V plane are mapped. In addition, the calculation device 73 assigns the irradiation output of the measuring laser light to each irradiation point 250 that is mapped on the B-V plane. This allows for three-dimensional laser power mapping with laser output information added to the B-V plane. The calculation device 73 repeats this operation multiple times as needed.

Moreover, the calculation device 73 may calculate the irradiation time for each irradiation point instead of calculating the irradiation output of the cutting laser light, assigning an irradiation time to each irradiation point mapped on the B-V plane.

Furthermore, the calculation device 73 may also calculate both the irradiation output and the irradiation time for each irradiation point, assigning the irradiation output and the irradiation time to each irradiation point mapped on the B-V plane.

Note that when assigning irradiation times in the optical axis direction (A-scan data), it is impossible to assign irradiation times exceeding the A-scan processing time. Therefore, if a predetermined cutting range is not reached within the set irradiation time, the operation of the calculation device 73 is programmed to repeat the A-B-V scan process, as shown in FIG. 20A, until the predetermined cutting range is reached.

Similarly, when assigning irradiation output in the optical axis direction (A-scan data), if a predetermined cutting range is not reached within the set irradiation output during the A-scan processing time, the operation of the calculation device 73 is programmed to repeat the A-B-V scan process until the predetermined cutting range is reached.

Fifth Embodiment

Next, the dental CAD/CAM device according to an embodiment of the present invention is described with reference to FIG. 21. Note that the same reference numerals are given to the components identical to the optical coherence tomography image generation device 1B shown in FIG. 10 and the optical coherence tomography image generation device 1C shown in FIG. 14, and their descriptions are omitted.

The dental CAD/CAM device 2 includes a tooth three-dimensional information measurer 3, a probe 4, a laser cutter 5, a two-dimensional scanning mechanism 41, an optical path coaxializer 40, a tooth fixer 60, a restoration designer 70, and a restoration producer 80. The dental CAD/CAM device 2 differs from the optical coherence tomography image generation device 1B (see FIG. 10) and the optical coherence tomography image generation device 1C (see FIG. 14) in that it possesses the restoration producer 80.

The restoration producer 80 produces dental restorations based on data obtained from the restoration designer 70.

The restoration producer 80 includes a means for producing the restorations using the restoration creation program, and includes either a milling processing device or a three-dimensional printer. If the restoration producer 80 is a milling processing device (CAM device), it cuts the raw material of the restoration, and if it is a three-dimensional printer, it stacks the raw material of the restoration. If the material of the restoration is resin, it is produced at the same size as the final product, while if it is ceramic, it is processed at 1.1 times the size of the final product, then further sintered in a sintering device, ultimately resulting in a restoration of the exact size as the final product.

Figure 21:
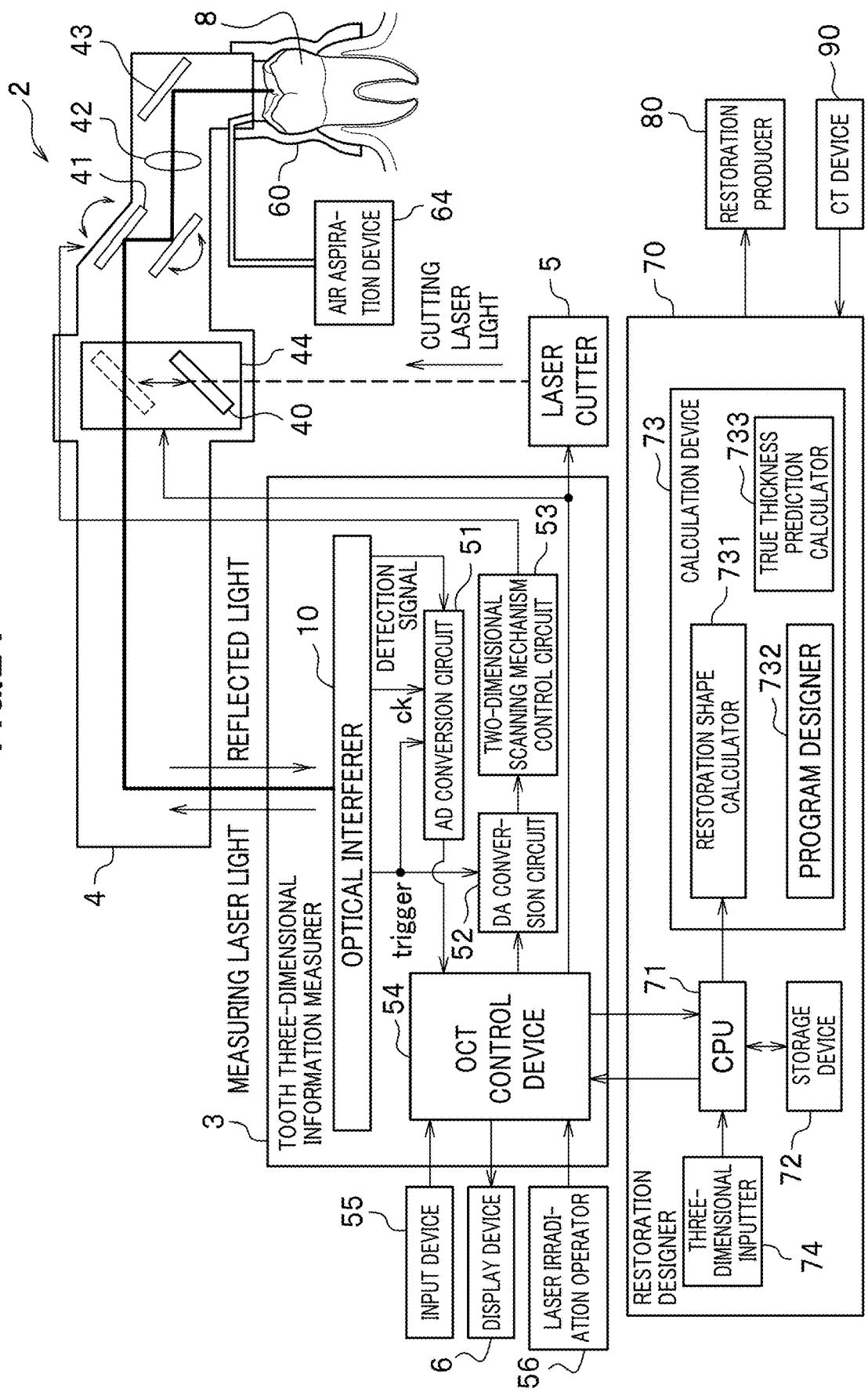
FIG. 21 is a schematic diagram showing the configuration of the dental CAD/CAM device according to the embodiment of the present invention.

In FIG. 21, the restoration designer 70 has a configuration that caters to both manual cutting (third embodiment) and automatic cutting (fourth embodiment), but it could also have a configuration that is specifically designed for either one.

For example, if the restoration designer 70 has a configuration that caters to manual cutting (third embodiment), the dental CAD/CAM device 2 includes a laser irradiation operator 56, and in this case, the three-dimensional inputter 74 and the true thickness prediction calculator 733 of the restoration designer 70 are unnecessary. In this case, the two-dimensional scanning mechanism control circuit 53 outputs a motor drive signal to drive or stop the motor of the two-dimensional scanning mechanism 41 in synchronization with the cutting information sent from the laser irradiation operator 56 via the OCT control device 54. The restoration-filled surface shape 127 stored in the storage device 72 of the restoration designer 70 is the surface shape of a tooth that has been cut for restoration filling. In addition, the calculation device 73 designs a restoration creation program based on the pre-cut tooth surface shape 125 and the restoration-filled surface shape 127. The restoration designer 70 sends the restoration creation program (design information) to the restoration producer 80.

Also, for example, if the restoration designer 70 has a configuration capable of catering to automatic cutting (fourth embodiment), the restoration designer 70 includes a three-dimensional inputter 74, and the laser irradiation operator 56 is unnecessary. Furthermore, it is suitable for the restoration designer 70 to include the true thickness prediction calculator 733. In this case, the restoration-filled surface shape 127 stored in the storage device 72 of the restoration designer 70 is the surface shape of a tooth to be cut for restoration filling. In addition, the calculation device 73 designs a restoration creation program based on the pre-cut tooth surface shape 125 and the restoration-filled surface shape 127, and further designs a tooth cutting program for laser cutting the tooth to be cut. The restoration designer 70 sends the restoration creation program (design information) to the restoration producer 80, and the tooth cutting program (cutting information) to the OCT control device 54 of the tooth three-dimensional information measurer 3. The two-dimensional scanning mechanism control circuit 53 outputs a motor drive signal to drive or stop the motor of the two-dimensional scanning mechanism 41 in synchronization with the cutting information (tooth cutting program) sent from the restoration designer 70 via the OCT control device 54.

Modified Example

Figure 22:
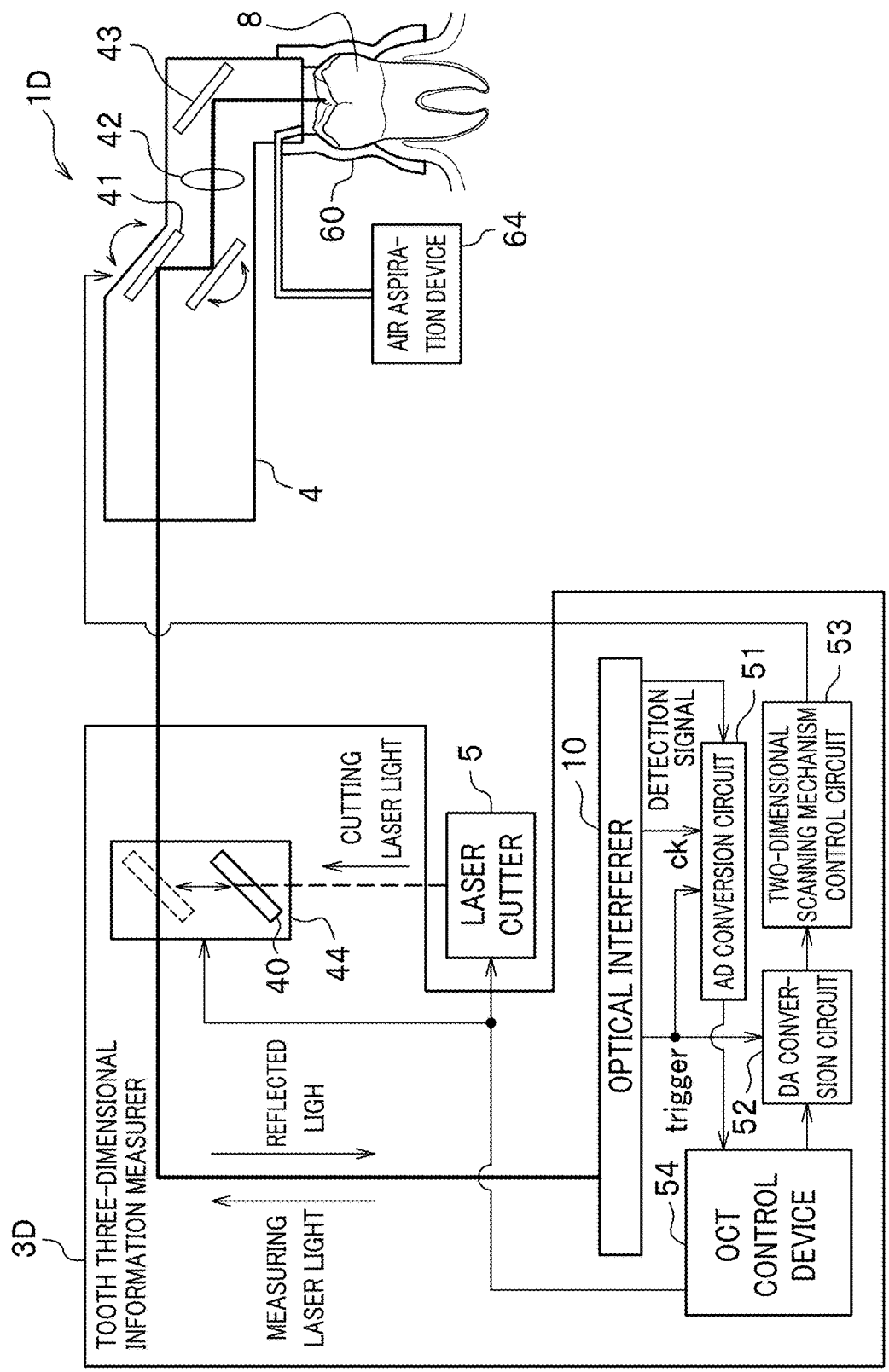
FIG. 22 is a schematic diagram showing the configuration of an optical coherence tomography image generation device according to a modified example of the present invention, with some parts omitted.

Next, the optical coherence tomography image generation device according to a modified example of the present invention is described with reference to FIG. 22. Note that the same reference numerals are given to the components identical to the optical coherence tomography image generation device 1 shown in FIGS. 1 and 4, and their descriptions are omitted. In each embodiment described above, an example was shown where the optical path coaxializer 40 is arranged inside the probe 4, but the present invention is not limited to this. As shown in FIG. 22, the optical path coaxializer 40 may be arranged on the side of the device main body, as in the optical coherence tomography image generation device 1D. The tooth three-dimensional information measurer 3D shown in FIG. 22 includes the optical path coaxializer 40 and the optical path switcher 44, in addition to the configuration of the tooth three-dimensional information measurer 3 shown in FIG. 1 (that is, the configuration of the so-called conventional OCT device). Also, it is configured that the cutting laser light can enter the optical path coaxializer 40 from the laser cutter 5.

When the optical path coaxializer 40 is to be installed outside the probe 4, as shown in FIG. 22, a fiber is used that can transmit laser light of both the cutting laser light wavelength and measuring laser light wavelength in the light guide path from the tooth three-dimensional information measurer 3D to the probe 4. In addition, when using a manipulator using a mirror in the light guide path, a mirror is used that can reflect laser light of both wavelengths. In addition, for the optical path coaxializer 40, for example, an optical switch or optical coupler may be used. In the optical coherence tomography image generation device 1D, instead of the optical path switcher 44, the optical path switcher 44*a* shown in FIG. 3A may be provided. In addition, in the optical coherence tomography image generation device 1D, instead of the optical path coaxializer 40 and the optical path switcher 44, the optical path coaxializer 40A shown in FIG. 3B may be provided.

Similarly, FIG. 21 shows an example where the optical path coaxializer 40 is arranged within the probe 4 of the dental CAD/CAM device 2, but the present invention is not limited to this. As in the optical coherence tomography image generation device 1D shown in FIG. 22, the optical path coaxializer 40 may be arranged on the side of the device main body (the side of the tooth three-dimensional information measurer 3). Moreover, in such a case, it is also acceptable to appropriately replace the optical path coaxializer 40 and the optical path switcher 44 with a configuration that includes the optical path switcher 44*a* and the optical path coaxializer 40A.

In the above-described embodiments, the cases have been explained where a galvano mirror is adopted as the two-dimensional scanning mechanism 41, but it is not limited to this, and a two-dimensional MEMS mirror can also be adopted. The elements of the two-dimensional MEMS mirror include, for example, a silicon layer in which a movable structure, such as a mirror that fully reflects light or a flat coil for electromagnetic driving that generates electromagnetic force, is formed, a ceramic base, and a permanent magnet, formed into a three-layer structure. This allows control that statically and dynamically tilts in the X-direction and Y-direction in proportion to the magnitude of the current flowing into the coil.

REFERENCE SIGNS LIST

1, 1B, 1C, 1D optical coherence tomography image generation device
2 dental CAD/CAM device
3, 3D tooth three-dimensional information measurer
4 probe
5 laser cutter
6 display device
8 tooth
10 optical interferer
40, 40A optical path coaxializer
41 two-dimensional scanning mechanism
42 focusing lens
43 mirror
44, 44*a* optical path switcher
45 tip of probe
51 AD conversion circuit
52 DA conversion circuit
53 two-dimensional scanning mechanism control circuit
54 OCT control device
55 input device
56 laser irradiation operator
60 tooth fixer
62 probe holder
63 opposing tooth fitting part
64 air aspiration device (smoke remover)
70 restoration designer
71 CPU
72 storage device
73 calculation device
731 restoration shape calculator
732 program designer
733 true thickness prediction calculator
74 three-dimensional inputter
80 restoration producer
125 pre-cut tooth surface shape
127 restoration-filled surface shape
150 cursor

The invention claimed is:

1. An optical coherence tomography image generation device comprising:
    a tooth three-dimensional information measurer that irradiates a tooth with measuring laser light to measure a tooth surface shape and tooth interior as tooth three-dimensional information, and visualizes the tooth three-dimensional information to display a tooth image on a display device;
    a laser cutter that irradiates the tooth with cutting laser light to cut the tooth;
    a two-dimensional scanning mechanism that scans laser light, which is either the measuring laser light and/or the cutting laser light, in two dimensions;
    a probe that includes the two-dimensional scanning mechanism, and outputs the laser light, which has passed through the two-dimensional scanning mechanism, from a tip thereof; and an optical path coaxializer that coaxializes an optical path of the measuring laser light entering the two-dimensional scanning mechanism with an optical path of the cutting laser light entering the two-dimensional scanning mechanism.

2. The optical coherence tomography image generation device according to claim 1, further comprising:
an optical path switcher that switches optical paths so that one optical path of either the measuring laser light or the cutting laser light is blocked and the other optical path passes through the two-dimensional scanning mechanism.

3. The optical coherence tomography image generation device according to claim 1, wherein the optical path coaxializer is an optical path sharer that shares the optical paths of the measuring laser light and the cutting laser light, which are incident from mutually perpendicular directions, and emits the measuring laser light and the cutting laser light to the two-dimensional scanning mechanism via a coaxial optical path.

4. The optical coherence tomography image generation device according to claim 1, further comprising:
a tooth fixer that fixes the probe to the tooth, wherein
the tooth three-dimensional information measurer displays an image of the tooth fixed by the tooth fixer on the display device, and
the laser cutter cuts the tooth fixed by the tooth fixer.

5. The optical coherence tomography image generation device according to claim 4, wherein
the tooth fixer includes
a tooth fixation holder that is capable of being attached and detached to the tooth and, when mounted on the tooth, contacts and fixes to the tooth or periodontal tissues, and
a probe holder that identifies a single position for the probe when attaching to or detaching from the tip of the probe, and
the probe holder opened on the side where the tooth is positioned when the tooth fixation holder is fixed to the tooth.

6. The optical coherence tomography image generation device according to claim 5, wherein
a shape of the tooth fixation holder is a mouthpiece shape.

7. The optical coherence tomography image generation device according to claim 5, wherein
the tooth fixation holder includes a pair of clamps that clamp both side surfaces of a measurement target tooth, and is a fixation tool that is configured to freely open, close, and clamp the pair of clamps by an elastic force of an elastic body or a holding force of a screw.

8. The optical coherence tomography image generation device according to claim 5, wherein
the tooth fixer includes an opposing tooth fitting part that is formed on the probe holder and fits with an opposing tooth of a measurement target tooth.

9. The optical coherence tomography image generation device according to claim 4, further comprising:
a restoration designer that designs dental restorations based on the tooth three-dimensional information measured by the tooth three-dimensional information measurer.

10. The optical coherence tomography image generation device according to claim 9, wherein
the restoration designer includes
a storage device that stores a pre-cut tooth surface shape which is the surface shape of a tooth previously measured by the tooth three-dimensional information measurer before cutting a measurement target tooth using the laser cutter, and a restoration-filled surface shape which is the surface shape of a tooth that has been cut for restoration filling or a tooth to be cut, and
a calculation device that designs at least a restoration creation program based on the pre-cut tooth surface shape and the restoration-filled surface shape stored in the storage device.

11. The optical coherence tomography image generation device according to claim 10, further comprising:
a laser irradiation operator that operates the laser irradiation of the laser cutter, wherein
the restoration-filled surface shape is the surface shape of a cut tooth.

12. The optical coherence tomography image generation device according to claim 11, wherein
the image of the tooth surface shape displayed on the display device is one of a 3D image, an en-face image, and a cross-sectional image, or a combination thereof, and
the laser irradiation operator includes a laser operation switch that performs irradiation position control operations and laser irradiation control by mouse operation or joystick operation.

13. The optical coherence tomography image generation device according to claim 10, wherein
the restoration-filled surface shape is the surface shape of a tooth to be cut,
the restoration designer includes a three-dimensional inputter that allows an operator to input a three-dimensional cutting range on a screen,
the calculation device designs the restoration creation program by creating the restoration-filled surface shape from the cutting range inputted from the three-dimensional inputter, and
the calculation device further designs a tooth cutting program to laser-cut the tooth to be cut.

14. The optical coherence tomography image generation device according to claim 13, wherein
the cutting range inputted from the three-dimensional inputter is a range determined by specifying the cutting region and cutting depth on a two-dimensional plane on a 3D image, an en-face image, or a cross-sectional image.

15. The optical coherence tomography image generation device according to claim 13, wherein
the tooth three-dimensional information measurer measures brightness information on each of the three-dimensional coordinates of the tooth as the tooth three-dimensional information,
the calculation device includes a true thickness prediction calculator that uses the brightness information on each of the three-dimensional coordinates of the tooth included in the cutting range inputted from the three-dimensional inputter to predict and calculate a true thickness of the cutting range.

16. The optical coherence tomography image generation device according to claim 15, wherein
the true thickness prediction calculator
identifies a tissue in the cutting range from histogram characteristics and brightness information obtained from a cross-sectional image in a depth direction of the tooth, and
estimates the true thickness of the cutting range from a refractive index of the identified tissues and a depth on the cross-sectional image in the depth direction.

17. The optical coherence tomography image generation device according to claim 15, wherein
the true thickness prediction calculator
refers to a CT value, which is an image density value obtained in advance from images taken by an external CT device, of a cross-section in a depth direction of a measurement target tooth,
identifies a tissue by referring to CT value information at a position indicated by a predetermined brightness value of the brightness information obtained from a cross-sectional image in a depth direction of the tooth measured by the tooth three-dimensional information measurer, and
estimates the true thickness of the cutting range from a refractive index of the identified tissue and a depth on the cross-sectional image in the depth direction.

18. The optical coherence tomography image generation device according to claim 15, wherein
the calculation device
calculates an irradiation time and/or irradiation output of the measuring laser light based on the information of the three-dimensional cutting range inputted from the three-dimensional inputter, and
matches multiple irradiation points by the cutting laser light, which are set when the two-dimensional scanning mechanism is shared by the cutting laser light and the measuring laser light that have been made coaxial in terms of optical path by the optical path coaxializer, to the multiple measurement points by the measuring laser light, and assigns each of the multiple irradiation points the calculated irradiation time and/or irradiation output.

19. The optical coherence tomography image generation device according to claim 1, further comprising:
a smoke remover at a tip of the probe, which aspirates smoke or blow the smoke when the smoke is generated by irradiation with the cutting laser light, thus eliminating the smoke.

20. The optical coherence tomography image generation device according to claim 1, wherein
the cutting laser light is an erbium-YAG laser (Er: YAG), an erbium-chromium-YSGG laser (Er, Cr, YSGG), or a carbon dioxide laser.

21. A dental CAD/CAM device comprising:
a tooth three-dimensional information measurer that irradiates a tooth with measuring laser light to measure a tooth surface shape and tooth interior as tooth three-dimensional information, and visualizes the tooth three-dimensional information to display a tooth image on a display device;
a laser cutter that irradiates the tooth with cutting laser light to cut the tooth;
a two-dimensional scanning mechanism that scans laser light, which is either the measuring laser light and/or the cutting laser light, in two dimensions;
a probe that includes the two-dimensional scanning mechanism, and outputs the laser light, which has passed through the two-dimensional scanning mechanism, from a tip thereof;
an optical path coaxializer that coaxializes an optical path of the measuring laser light entering the two-dimensional scanning mechanism with an optical path of the cutting laser light entering the two-dimensional scanning mechanism;
a tooth fixer that fixes the probe to the tooth;
a restoration designer that designs dental restorations based on the tooth three-dimensional information measured by the tooth three-dimensional information measurer; and
a restoration producer that produces dental restorations based on data obtained from the restoration designer.

22. The dental CAD/CAM device according to claim 21, wherein
the restoration designer includes
a storage device that stores a pre-cut tooth surface shape which is the surface shape of a tooth previously measured by the tooth three-dimensional information measurer before cutting the measurement target tooth using the laser cutter, and a restoration-filled surface shape which is the surface shape of a tooth to be cut for restoration filling,
a calculation device that designs at least a restoration creation program based on the pre-cut tooth surface shape and the restoration-filled surface shape stored in the storage device, and
a three-dimensional inputter that allows an operator to input a three-dimensional cutting range on a screen, and
the calculation device designs the restoration creation program by creating the restoration-filled surface shape from the cutting range inputted from the three-dimensional inputter, and
the calculation device further designs a tooth cutting program to laser-cut the tooth to be cut.

23. The dental CAD/CAM device according to claim 21, further comprising:
a laser irradiation operator that manipulates laser irradiation timing for the laser cutter, wherein
the restoration designer includes
a storage device that stores a pre-cut tooth surface shape which is the surface shape of a tooth previously measured by the tooth three-dimensional information measurer before cutting the measurement target tooth using the laser cutter, and a restoration-filled surface shape which is the surface shape of a tooth that has been cut for restoration filling, and
a calculation device that designs a restoration creation program based on the pre-cut tooth surface shape and the restoration-filled surface shape stored in the storage device.

24. The dental CAD/CAM device according to claim 22, wherein
the restoration producer includes a means for producing the restorations using the restoration creation program, and includes either a milling processing device or a three-dimensional printer.

* * * * *